United States Patent [19]

Harrison

[11] Patent Number: 5,691,917
[45] Date of Patent: Nov. 25, 1997

[54] EVENT-PROCESSING SYSTEM AND METHOD OF CONSTRUCTING SUCH A SYSTEM

[75] Inventor: Keith Alexander Harrison, Chepstow, United Kingdom

[73] Assignee: Hewlett-Packard Company, Palo Alto, Calif.

[21] Appl. No.: 435,490

[22] Filed: May 5, 1995

[30] Foreign Application Priority Data

Jun. 10, 1994 [EP] European Pat. Off. ............ 94304210.1

[51] Int. Cl.$^6$ .................................................. G06F 17/00
[52] U.S. Cl. .................................................. 364/514 B
[58] Field of Search ............... 364/514 B, 514 C, 364/551.01, 579; 345/200.11, 183.15, 185.02

[56] References Cited

U.S. PATENT DOCUMENTS

| | | | |
|---|---|---|---|
| 5,063,523 | 11/1991 | Vrenjak | 364/514 |
| 5,223,827 | 6/1993 | Bell et al. | 395/185.02 |
| 5,321,837 | 6/1994 | Daniel et al. | 395/200.11 |
| 5,375,070 | 12/1994 | Hershey et al. | 364/579 |
| 5,446,680 | 8/1995 | Sekiya et al. | 364/551.01 |
| 5,500,855 | 3/1996 | Hershey et al. | 370/17 |
| 5,572,674 | 11/1996 | Ernst | 395/200.11 |
| 5,581,732 | 12/1996 | Dann | 395/475 |

FOREIGN PATENT DOCUMENTS 0 537 098 A2  4/1993  European Pat. Off. ........ G06F 11/34

OTHER PUBLICATIONS

Globecom '93, vol. 2, Dec. 1993, New York, US, pp. 1222-1226, K. Becker et al., Domains: Concepts for networking systems managment . . .
IEEE Network Operations and Management Symposium, vol. 3, Feb. 1994, US, pp. 846-855, J. Jakobson et al., Knowledge based GUI for network . . .
Electronics & Communications in Japan, Part I—communications, vol. 75, No. 12, Dec. 1992, New York, US, pp. 24–37, R. Kishmoto European Search Report dated 2 Dec. 1994, EP 94 30 4210.

*Primary Examiner*—Ellis B. Ramirez

[57] ABSTRACT

A limited number of different types of event-processing node are provided for use as building blocks in constructing an event-processing system intended to receive and process event information about basic events occurring in a system being monitored, such as a telecommunications system. The event-processing system is constructed by interconnecting selected ones of the nodes into a network. Each event-processing node receives event data items in one or more input streams and processes these event data items to produce an output stream of event data items. Each event data item relates either to a basic event or to a combination of such events and includes event data that is indicative of the nature and time of occurrence thereof in the system being monitored. Generally, certain of the nodes effect processing on the basis of each input event data item taken individually, whilst other of the nodes are responsive to the presence of a predetermined inter-relationship between events represented by event data items.

18 Claims, 15 Drawing Sheets

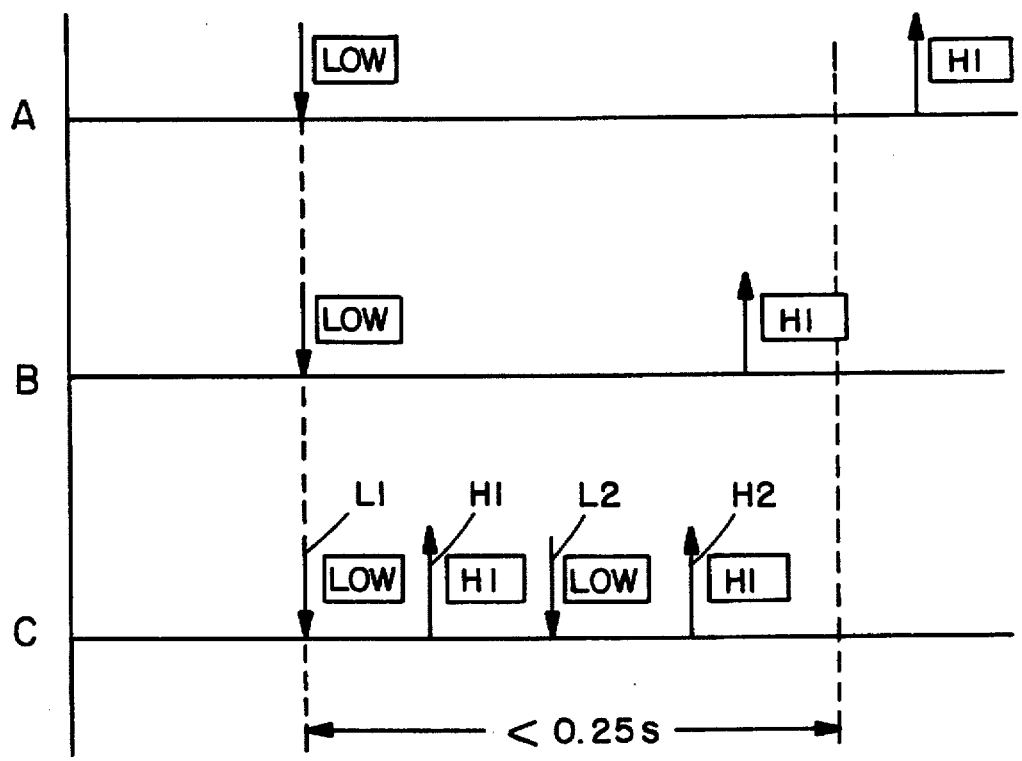
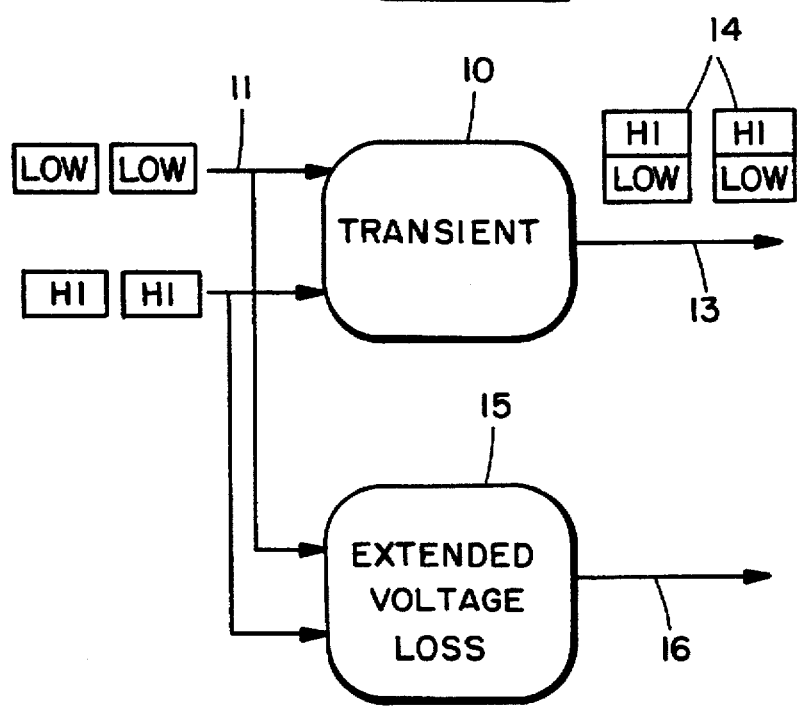

FIG. 5A.
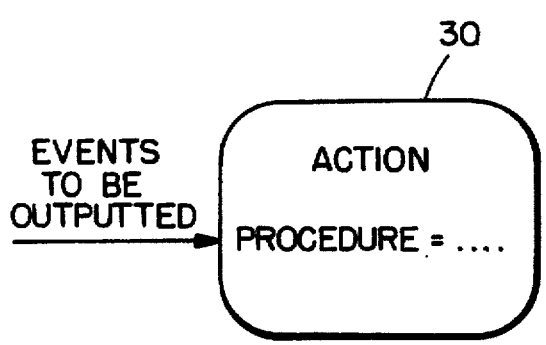
FIG. 5B.
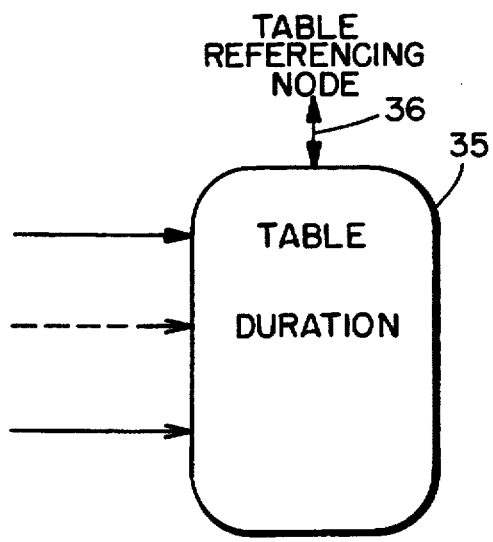
FIG. 5C.
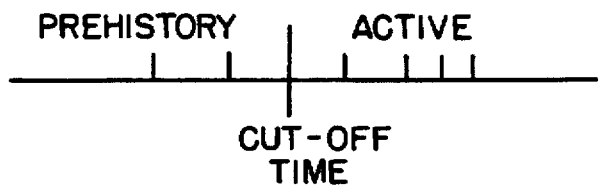
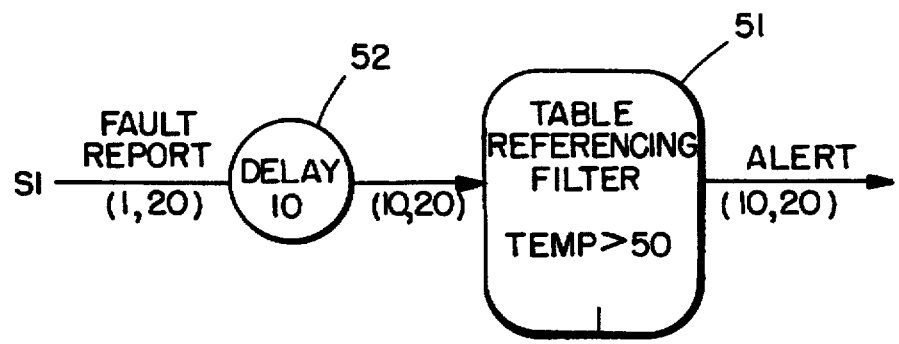
FIG. 6B.
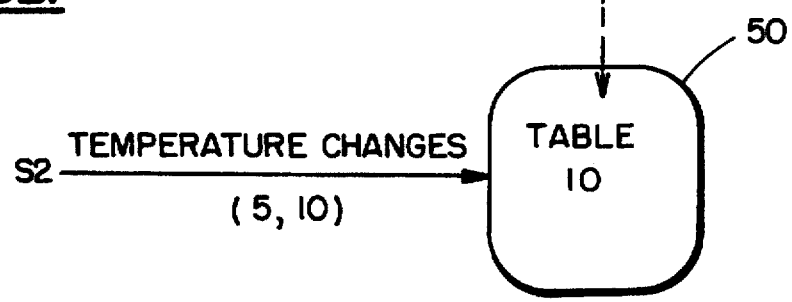

EVENT-PROCESSING SYSTEM AND METHOD OF CONSTRUCTING SUCH A SYSTEM

FIELD OF THE INVENTION

The present invention relates to an event-processing system for receiving and processing event information about events occurring in a system being monitored, such as a telecommunications network; the present invention further relates to a method of constructing such a system from basic processing blocks.

DISCUSSION OF THE PRIOR ART

Complex systems, such as telecommunications systems and computer networks, generally have associated monitoring systems the purpose of which is to detect abnormal behaviour. To this end, either the monitored system itself or associated monitoring probes are arranged to generate event messages upon the occurrence of certain events in the monitored system, these events being typically changes in the state of a part of the system. The detected events will generally include events indicative of a system overload or failure. Event messages are passed to an appropriate portion of the monitoring system for interpreting by event handlers of the monitoring system. A typical known event handler will examine each incoming event message to ascertain if the event represented thereby requires any action to be taken. Thus, for example, in U.S. patent U.S. Pat. No. 5,063,523, a system is described in which the attributes of each incoming event are pattern-matched against a set of predetermined rules and, if a match is found, a corresponding command file is then executed.

With complex systems, however, the number of events being generated can be very high—for example, if a SONET OC48 fibre is cut then up to 300,000 events could be generated in a 60-second period. In such circumstances, it is not practical, or indeed useful, to carry out a full analysis on each event. In order to handle such streams of events, it is known to pattern-match against a window of the last n events, the underlying concept being that particular faults will give rise to particular patterns of events.

Existing event processing systems, whether role based or based on pattern-matching of event patterns, all tend to be hand-crafted for the particular system being monitored. Generally no current event processing system provides a readily scalable architecture that processes and combines events in an easily understood manner.

Accordingly, it is an object of the present invention to provide an event-processing system, and a method of constructing the same, that handles events in an understandable and scalable manner.

SUMMARY OF THE INVENTION

According to one aspect of the present invention, there is provided an event-processing system for receiving and processing event information about basic events occurring in a system being monitored, the event-processing system comprising:

a plurality of discrete event-processing nodes each operative to process event data items, each event data item relating either to a basic event or to a combination of such events and having event data that is indicative of the nature and time of occurrence thereof in the system being monitored, each node receiving at least one input stream of event data items which it processes to produce at least one output stream of event data items; and means for intercommunicating the nodes to form a network of nodes in which the output streams of at least some of nodes form the input streams of other of the nodes, at least one node constituting an input node for receiving the aforesaid event information in the form of at least one input stream.

The event-processing nodes will generally comprise both single-event processing nodes operative to effect processing on the basis of each input event data item taken in isolation; and cross-event processing nodes operative to detect a predetermined inter-relationship between events represented by event data items, the existence of this predetermined relationship being a necessary (but possibly not sufficient) condition for the output of an event data item. By providing a standard set of such nodes, it becomes possible easily to construct a wide range of different event processing systems capable of meeting most needs.

One possible type of cross-event processing node takes the form of a product node for receiving a plurality of input streams of event data items, the predetermined relationship looked for by the node being between event data items present in the input streams and being satisfied upon the existence of event data items in the input streams that are in given time relation to each other, each event data item of the output stream relating to a combination of the events represented by the event data items of the input streams.

Another possible type of cross-event processing node takes the form of an unless node for receiving first and second input streams of event data items, the predetermined relationship looked for by the node being between event data items of the input streams and being satisfied upon the existence of an event data item in the first input stream without the existence of an event data item in the second input stream that is in given time relation to the event data item of the first input stream, each event data item of the output stream corresponding to an event data item of the first input stream.

Still another possible type of cross-event processing node takes the form of a table-referencing node, such a node being used in conjunction with a table node. A table node is a node arranged to receive an input stream of event data items and to store event data therefrom including the time of occurrence of the corresponding event or combination of events, the table node being responsive to being interrogated with a specified time, to return event data current at that time. A table-referencing processing node is one for which the predetermined relation looked for by the node is a given time relation between an input event data item and a particular event data item which, if it has occurred, has its event data stored in a table node. The given time relation is taken as being met if at a particular time the particular event data item was the current item stored in the table node; accordingly, the table-referencing node tests for the required time relation by interrogating the table node with the aforesaid particular time and examining the returned event data to ascertain if it indicates the presence of said particular event data item. Generally, the event data stored in the table node for each event data item comprises the value of a given parameter of the system being monitored; the said particular event data item of interest is then any such item the stored parameter value of which lies in a predetermined range of values.

As regards the single-event processing nodes, one possible type of such nodes is a filter node for selecting from an input stream any event data item the event data of which meets predetermined selection criteria, the selected event data items being output in an output stream from the node.

Another possible type of single-event processing node is a delay node for receiving event data items in an input stream and for delaying the output of each such event data item in an output stream until a predetermined time period after the time of occurrence associated with that item.

Preferably, for each type of event-processing node there is provided functional processing code for carrying out the processing associated with the node, each event-processing node having associated data including:

first data, the same for all nodes of the same type, that identifies the functional processing code relevant to that node type whereby the functional processing code is shared by all nodes of the same type; and second data, specific to each node, including data that identifies for the or each output stream associated with the node, the destination of the stream.

According to another aspect of the present invention there is provided a method of building an event-processing system for receiving and processing event information about basic events occurring in a system being monitored, the method comprising the steps of:

providing a library of event-processing nodes each operative to process event data items where each event data item relates either to a basic event or to a combination of such events and has event data that is indicative of the nature and time of occurrence thereof in the system being monitored, each node being intended to receive at least one input stream of event data items which it can then process to produce at least one output stream of event data items; and selecting nodes from the library and intercommunicating the nodes to form a network of nodes in which the output streams of at least some of the nodes form the input streams of other of the nodes, at least one node constituting an input node for receiving event information in the form of at least one input stream.

BRIEF DESCRIPTION OF THE DRAWINGS

An event-processing system embodying the invention, and a method of constructing such a system according to the invention, will now be particularly described by way of non-limiting example, with reference to the accompanying diagrammatic drawings:

FIG. 1 is a time diagram showing three event sequences A, B and C;

FIG. 2 is a block diagram of an event-processing system for processing the FIG. 1 event sequences to detect transient events;

FIG. 5A is a block diagram of an action node;

FIG. 5B is a block diagram of a table node;

FIG. 5C is a time diagram concerning the operation of the FIG. 5B table node;

FIG. 6B is a diagram illustrating the operation of a table-referencing node that carries out a filtering function;

DESCRIPTION OF THE PREFERRED EMBODIMENT

Figure 3A:
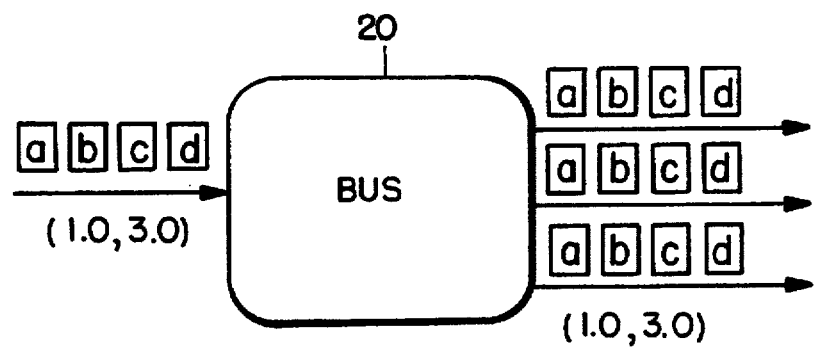
FIG. 3A is a block diagram of bus-node.
Figure 3B:
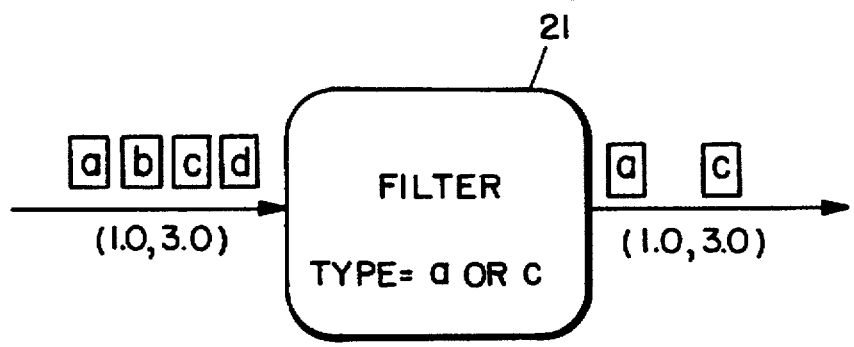
FIG. 3B is a block diagram of a filter node.

The event processing systems to be described hereinafter are taken to exist in an environment in which they are passed event information about a system being monitored as one or more streams of event data items. Each such event data item relates to a basic event that has occurred in the system being monitored or to a combination of such basic events. Each event data item includes information about the nature of the basic event or composite event concerned and a time stamp indicating the time of occurrence of that event. In order to ensure that event data items input into the event processing system are of standard format, the event-processing system will generally be fronted by appropriate formatting hardware/software that receives event messages from the system being monitored and puts them into a standard event data item format. Whilst it is highly desirable that each event message is timestamped upon generation, it is conceivable that this is not done and, in this case, the formatting front end can itself provide a timestamp for each event message corresponding to the time of receipt of that message; this timestamp is then taken to be the time of occurrence of the underlying event in the system being monitored.

Generally, there is a global notion of time across the system being monitored and the event-processing system so that a timestamp given by the system being monitored has direct meaning to the event-processing system. Of course, in the exceptional case mentioned above where the system being monitored does not timestamp its event messages, the global notion of time need only extend across the event-processing system and its formatting front end.

Because event messages produced by the system being monitored may be generated at a variety of locations in that system and because the means for passing the event messages to the event-processing system may introduce variable delays, the stream (or streams) of event data items passed on to the event-processing system may not be strictly ordered; it is, however, possible to assume that the streams are almost ordered. Furthermore, as a practical matter, it is generally possible to place upper and lower bounds on the delay experienced by each event data item in transit to the event-processing system, these delays being hereafter referred to as "maxTD" and "minTD". The magnitude of these delays becomes important in situations where it is desired to test for whether or not one particular event has occured in a given time relationship to another event.

General Concepts

An event-processing system embodying the invention comprises a network of event-processing nodes each arranged to receive one or more streams of event data items and to merge, filter or combine event data items to produce a new stream which is passed on to another node. By appropriately structuring this network of nodes and appropriately choosing the functionality of each node, it is possible to detect particular combination of events, the corresponding event data items then being used to initiate appropriate external action (such as setting off an alarm or taking corrective measures).

In order to illustrate the general approach taken by an event-processing system embodying the present invention, FIG. 1 shows a simple example where the system being monitored is arranged to output a LOW event (downward arrow in Line A, FIG. 1) upon system supply voltage falling below a certain level, and to output to HI event (upward arrow, Line A, FIG. 1) upon the system supply voltage being reestablished. It may be desired to distinguish between two situations using the event-processing system, the first situation being where voltage loss extends for more than 0.25 seconds (an extended voltage loss—see Line A, FIG. 1), and a situation in which the voltage loss lasts for less than 0.25 seconds (a voltage loss transient—see Line B in FIG. 1).

Line C in FIG. 1 shows a situation where two voltage loss transients occur within 0.25 seconds, this example being used below.

FIG. 2 illustrates a conceptual model of how the event-processing system might produce the desired result. This model comprises a transient-detection block 10 that is fed with two input streams of event data items. The first of these input streams 11 is a stream of event data items representing voltage low events whilst the second of these streams 12 is a stream of event data items representing voltage high events. The transient-detection block 10 is arranged to generate an output 13 of event data items, each such item being generated when a voltage low event (as indicated by an event data item in stream 11) is followed by a voltage high event (as indicated by an event data item in stream 12) within a short period of time such as 0.25 second. Thus, for the situation represented by Line C of FIG. 1, the output stream 13 would contain two event data items 14 (these event data items may be each considered as representing a composite event in contrast to the event data items of streams 11 and 12 which represent basic events occurring in the system being monitored).

In the FIG. 2 model, two input streams 11 and 12 are also fed to an extended-voltage-loss block 15 that is arranged to output an event data item on line 16 only in the presence of a voltage loss lasting for more than 0.25 seconds (as in Line A, FIG. 1).

An important concept in the event-processing systems and construction methods to be described hereinafter is the provision of a limited set of basic nodes of different pre-defined functionality which can be used as a standard set of building blocks to build up a wide range of event-processing systems. The next section describes a set of suitable basic nodes that can be used to build the FIG. 2 event-processing system as well as an almost infinite variety of other such systems.

Basic Nodes

A library of basic nodes will now be described with reference to FIGS. 3, 4 and 5, FIGS. 3 and 4 showing event-processing nodes that receive one or more streams of event data items and output streams of event data items, and FIG. 5 showing nodes that take in streams of event data items and provide an output in a different form.

Single-event processing nodes—FIG. 3 shows event-processing nodes that treat each input event data item in isolation from other event data items. These nodes comprises:

A bus node 20 (see FIG. 3A) the purpose of which is to replicate an input stream of event data items to produce a plurality of corresponding output streams each containing the same event data items as the input stream. For this node, the maximum and minimum transit delays associated with the event data items are unchanged between the input and output streams; this is illustrated in the FIG. 3A example by the bracketed pairs of numbers associated with the input and output streams (this convention being used generally herein).

A filter node 21 (see FIG. 3B) that creates a new stream of events by taking a subset of the input stream. This subset is defined on the basis of a parameter carried by each input event data item; for example, if each event data item comprises an event type, then the filter node may carry out its selection based on type. Thus, in FIG. 3B, the filter node 21 is shown as receiving event data items relating to events of types "a", "b", "c", and "d" and selectively passing on only those event data items relating to events of type "a" or "c". Generally, the selection predicate will operate on one or more of the following parameters normally associated with an event data item:

unique id
  creation (timestamp) time
  arrival time
  value of an attribute

As with the bus node, the minimum and maximum delay times associated with the output stream are the same as those associated with the input stream.

Figure 3C:
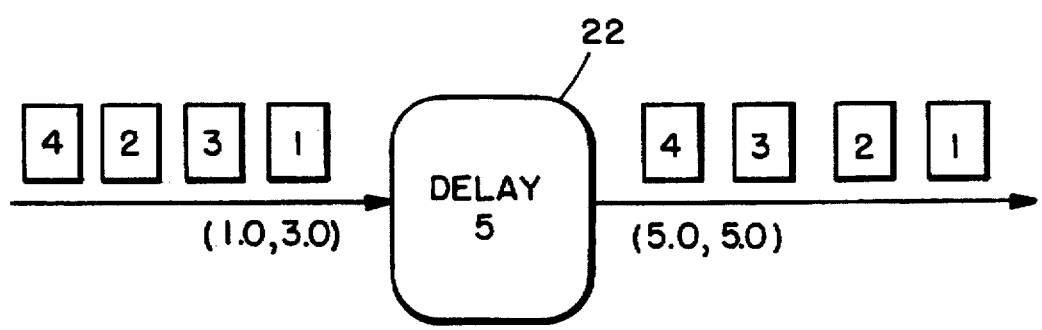
FIG. 3C is a block diagram of a delay node.
Figure 3D:
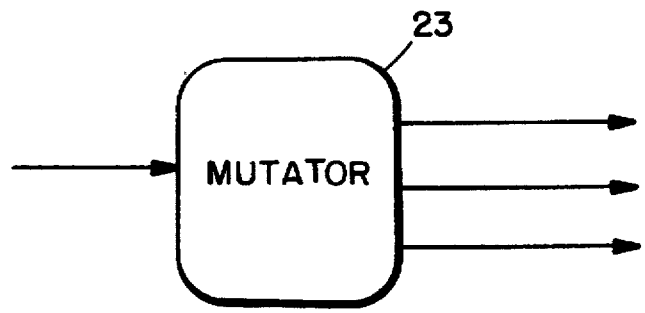
FIG. 3D is a block diagram of a mutator node.

A delay node 22 (see FIG. 3C). This node outputs each input event data item once the age of that item as indicated by its timestamp has exceeded a specified mount. In order for the node to effect this processing, it is, of course, necessary for the node to receive a time reference related to that used to provide the timestamp for the event data item. It will be appreciated that if the specified age amount equals or exceeds the maximum transit delay for the input stream, then the delay node 22 will output the event data items in ascending timestamp order. This reordering effect is the normal use of the delay node; however, another important use exists in relation to table nodes as will be explained more fully hereinafter. The minimum transit delay of the output stream from this node will be the maximum of the specified age amount and the minimum transit delay of the input stream; the maximum transit delay of the output stream will be equal to the maximum of the specified age mount and the maximum transit delay of the input stream.

A mutator node 23 (see FIG. 3D). this node serves to create new event data items from existing ones by selectively using the data from an input event data item to produce a new event data item of a different type. Thus, the mutator node can be used to change a composite-event event data item (the form of which will be described hereinafter) into a single-event event data item (also to be described) where the single event concerned is a user-defined higher level event rather than a basic event occuring in the system being monitored. Several new event data items of different types may be produced from each input event data item.

Figure 4A:
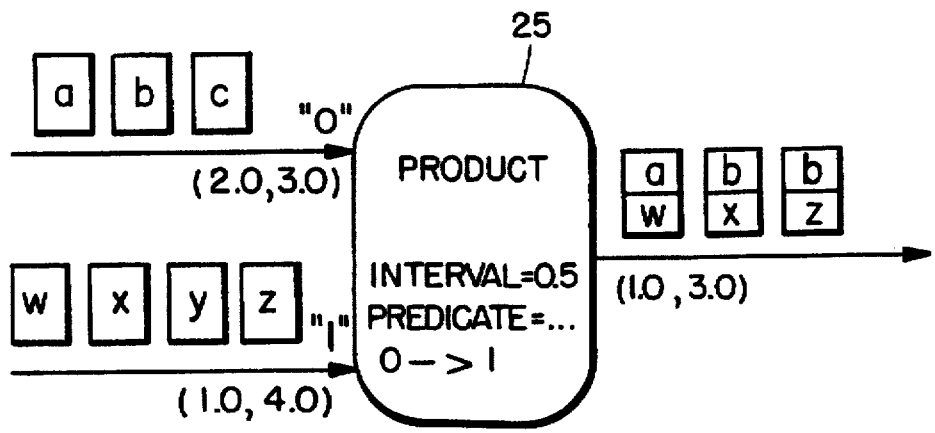
FIG. 4A Is a block diagram of a product node.

Cross-event processing nodes—FIG. 4 shows event processing nodes which output event data items upon detecting a predetermined relationship between event data items. These nodes comprises:

A product node 24 (see FIG. 4A). This node detects use and defines patterns involving one event data item from each of several input streams. This pattern is defined using the following features, the first of which is mandatory and the other two are optional:

the maximum width of the time interval containing the candidate event data items (this time interval is referenced relative to an event creation time);

a set of required orderings (for example, the candidate event data items from a first input stream must arrive before the candidate event data item from a second input stream);

a user defined predicate testing certain parameter values in the event data items, the predicate returning true if the set of candidate data items is acceptable.

The acceptable set of event data items is packaged into a composite event data item and output. The new event data item is given a creation timestamp equal to the latest creation timestamp of the constituent event data items. FIG. 4A shows a product node with two input streams that is arranged to output a composite event data item if an event data item on the upper input stream (input "0") is followed by a particular event data item on the lower input stream (input "1") within a period of 0.5 seconds; the predicate is used to define what types of event data items on the lower input stream are valid for each type of event data item received on the upper input stream. It may be noted that the functionality of interval width, ordering and predicate overlap. It would, for example, be possible to achieve the interval width and ordering within the predicate. In practice, it is better to make the pattern features more explicit by having the user define interval width and ordering separately. The minimum and maximum transit delays of the output stream will be considered later on.

Figure 4B:
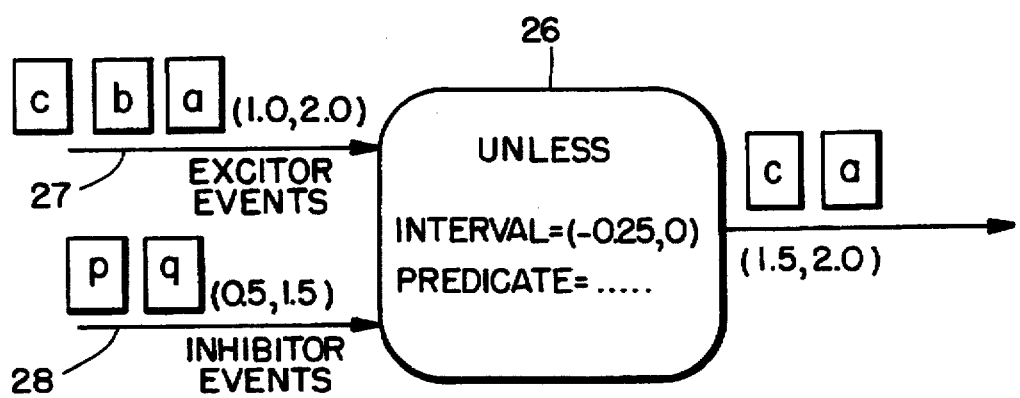
FIG. 4B is a block diagram of an unless node.

An unless node 26 (see FIG. 4B). This node has an excitor input 27 and an inhibitor input 28. The node will emit in its output stream any event data item received on the excitor input unless an event data item is received on the inhibitor input within a certain time window relative to the creation time timestamp of the excitor event data item. The inhibitor and/or excitor event data items can also be required to satisfy a predicate. Thus, in the example shown in FIG. 4B, the event data item "b" on the excitor input is filtered out (for example, due to the presence of the event data item "p" on the inhibitor input). The minimum and maximum transit delays of the output stream will be considered later on.

Figure 4C:
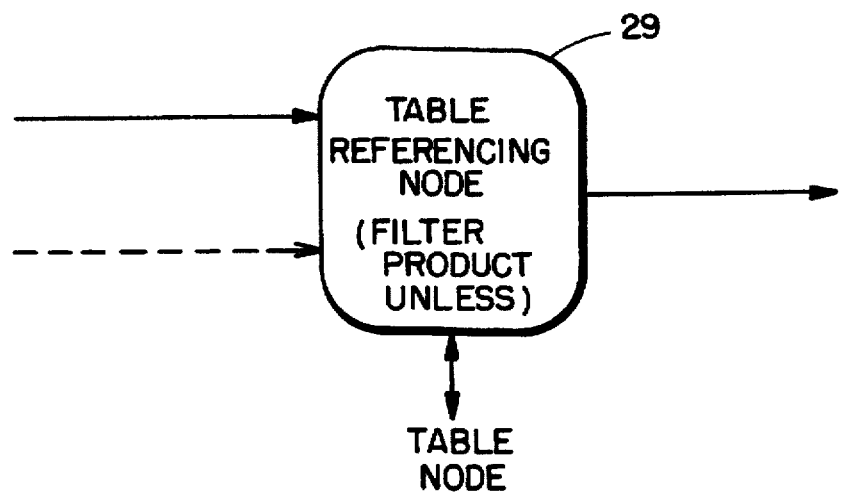
FIG. 4C Is a block diagram of a table-referencing node.

Table-referencing node 29 (see FIG. 4C). This cross-event processing node is any node containing a predicate which makes an external reference to a table node (to be described hereinafter). A table node contains event data extracted from a stream of event data items. A table-referencing node will only output an event data item if its associated predicate is satisfied upon reference to the table-node. A table-referencing node will generally be one of the nodes already described that utilises a predicate (the filter node 21, the product node 25, the unless node 26) but with a predicate that requires reference to event data that is not in the event data items being directly processed by the node. The transit delay characteristics and other features the table-referencing node will depend on the underlying node characteristics (that is whether it is a filter, product or unless node).

Special nodes. In addition to the event-processing nodes described above with reference to FIGS. 3 and 4, the basic library of nodes generally comprises the following nodes that do not output a stream of event-data items:

An action node 30 (see FIG. 5A). The action node takes in a stream of event data items and executes a user defined procedure for each item received. Typically, this procedure will convert the event data item into a desired format and send it outside the event-processing system.

A table node 35 (see FIG. 5B). It is often useful to be able to answer questions of the form "what was the value of the parameter X at time t"; it is the purpose of the table node to permit such questions to be asked particularly in relation to the execution of node predicates. A table node has one or more inputs for receiving event data items; event data items entering on one input may be used to add event data to the table whilst event data items entering on another input may be used to remove event data. Typically, in fact, a table node will simply have one input for receiving event data items and the table node will be configured to store the value of a parameter contained in each event data item against the timestamp value of that item. A table node has an interrogation interface 36 through which it can be interrogated as to the value of a particular parameter at a particular time. The table node responds to such an interrogation by giving the parameter value current at the specified time, that is, the latest parameter value at that specified time (in fact, the parameter value is indirectly given by the node returning a pointer to the event data item concerned). A table node is only expected to deal with parameter value interrogation for times within a particular time window; however, in order to satisfy such an interrogation, it may be necessary to store a parameter value older than the time window as this may be the parameter value that is still current for part (or all) of the time window. Thus, referring to FIG. 5C, the memory of a table node can be viewed as divided into two zones, namely an active zone corresponding to the table-node time window, and a prehistory zone that extends backward from the age of the time window (the cutoff time). Once the age of event data in the active memory zone exceeds the time window duration for the node, then it is transferred into the prehistory memory zone; at the same time as this is done the prehistory zone is searched for older event data that can now be deleted. Note that the duration of the storage window should exceed the maximum transit delays of the input event stream (or streams) so that event data will be retired in its correct order. It should also be noted that care must be taken to ensure that the interrogating node does not seek information about a parameter value at a particular time where it is possible that the event data item carrying that information is still in transit; in order to avoid this happening, a delay node of appropriate value can be inserted upstream of the interrogating node.

Example Event-Processing Node Networks

Figure 6A:
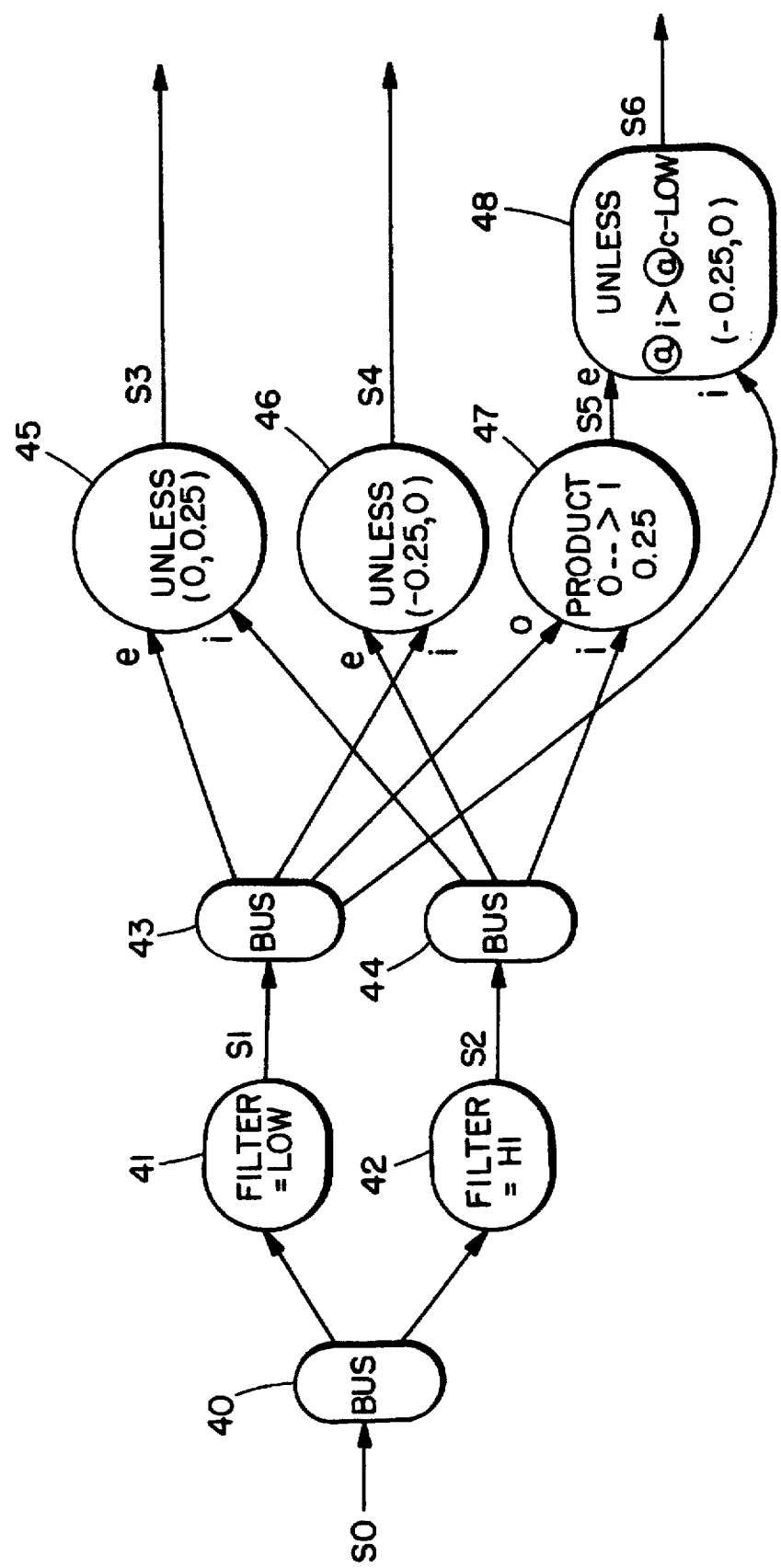
FIG. 6A is a diagram of a network constructed from nodes of FIGS. 3 and 4, this network implementing the event processing system of FIG. 2.

FIG. 6A shows how the FIG. 2 transient-detection event-processing system can be implemented using the standard nodes illustrated in FIGS. 3 and 4. A single input event stream S0 is assumed. From this, a voltage-low stream S1 and a voltage-high stream S2 (corresponding to the event data item streams on inputs 11 and 12 in FIG. 2) are derived by using a bus node 40 and two filter nodes 41 and 42. Both streams S1 and S2 are then fed to an unless node 45, an unless node 46 and a product node 47, this distribution being effected through bus nodes 43 and 44.

The unless node 45 passes on low-voltage events received on its excitor input (indicated by "e") in output stream S3 unless a voltage high event data item is received on the inhibitor input ("i") within 0.25 seconds; stream S3 thus contains event data items indicative of the start of an extended low voltage situation and thus corresponds to the output of block 15 in FIG. 2. The unless node 46 passes on voltage high event data items received on its excitor input unless a voltage low event data item has occurred in the preceding 0.25 seconds. The output stream S4 from the unless node 46 thus comprises event data items corresponding to the end of an extended voltage low situation. The information contained in stream S4 is not strictly needed for the implementation of the FIG. 2 event-processing system although this information may be useful in practical systems.

The product node 47 has the low voltage event data items fed to its input 0 and the voltage high event data items fed to its input 1. The product node 47 will output a composite event data item in stream S5 if an event data item on input 0 is followed within 0.25 seconds by an event data item on its input 1 (this ordering and time interval being indicated within the node symbol in FIG. 6A). The stream S5 thus contains composite event data items that are pairs of voltage low and high events such that the voltage low is followed by a voltage high within 0.25 seconds—in other words, the stream S5 is a stream of event data items representing transients. In fact, stream S5 also contains some unwanted event data items as may be understood by considering again FIG. 1C. In the example of FIG. 1C, four events all occur within 0.25 seconds, these being, in order, a voltage low event L1, a voltage high event H1, a voltage low event L2, and a voltage high event H2. The operation of the product node 47 is to combine any pairing of a voltage low event followed within 0.25 seconds by a voltage high event. There are, in fact, three such pairings for the FIG. 1C example, these being:

| L1; H1 | L2; H2 | L1; H2 |
| --- | --- | --- |

This last pairing results in the output of an unwanted event data item from the product node 47 inasmuch as this event data item does not correspond to a true transient event. The purpose of the unless node 48 is to eliminate such unwanted event data items and it does this by blocking the onward transmission from stream S5 to stream S6 of any event data item the voltage-low event component of which was created prior to a voltage-low event that itself occurred before the voltage-high event of the S5-stream event data item occurred; in other words, the unless node 47 only allows pairing of a voltage high event with the nearest preceding voltage low event. This is achieved by supplying the voltage low event data items to the inhibitor input of the node and then checking, for each composite event data item in stream S5, whether any of the voltage low events created in the 0.25 seconds before the creation time of the S5 event (and thus before the creation time of the voltage high component of that event), has a creation time later than that of the voltage low event in the S5 event data item; this creation time check is specified in the predicate of the unless node. The output stream S6 from the unless node will thus contain only the required transient event data items.

FIG. 6B shows an example of the use of a table node 50 by a table referencing node 51 having filter functionality which in this case is dependant solely on the data held by the table node. The FIG. 6B network is intended to receive event data items in stream S1 reporting some system fault X and then to output an alert only if the monitored system temperature at the time of occurrence of the fault exceeds 50° C. Changes in the system temperature are reported, for example, for every 2° C. change, by event data items in an event stream S2. The event stream S2 is fed to the table node 50 which has a storage time window of 10 time units. The stream S2 has minimum and maximum transit delay values of 5 and 10.

The basic operation of the FIG. 6B network is for the fault data items to be passed to the table-referencing filter node 51 which then looks up in table node 50 the monitored system temperature at the creation time of the fault event data item; if this temperature is greater than 50° C., then the fault event data item is output. However, in the present example the minimum and maximum transit delays associated with the fault event stream S1 are 1 and 20 respectively and this means that if the fault events are passed directly to the node 51, the table node 50 could be referenced before it has had a chance to be updated with the temperature of the monitored sytem at the time that a fault occured (the minimum transit delay of the fault event being 1 time unit whilst temperature-change event data items may be delayed for up to 10 time units). In order to avoid this situation, a delay 52 with a delay value of 10 is inserted in the fault event stream S1 giving the latter a minimum transit time of 10 thereby insuring that relevant temperature changes will have been recorded in the table node by the time they are needed.

Constructing New Nodes

The standard basic nodes of FIGS. 3 to 5 can be combined to form macro nodes—in other words, it may be helpful to specify a new node with particular functionality to facilitate network design, this node being in practice implemented by a combination of the basic nodes. Thus, for example, it may be useful to define a "consumes" node 60 (see FIG. 7) that is constructed from a product node 61, a bus node 62, and an unless node 63. The macro consumes node has two inputs with an event on one input being consumed by the earliest matching event on the other input; once matched the matched event then plays no further part in processing.

Figure 7:
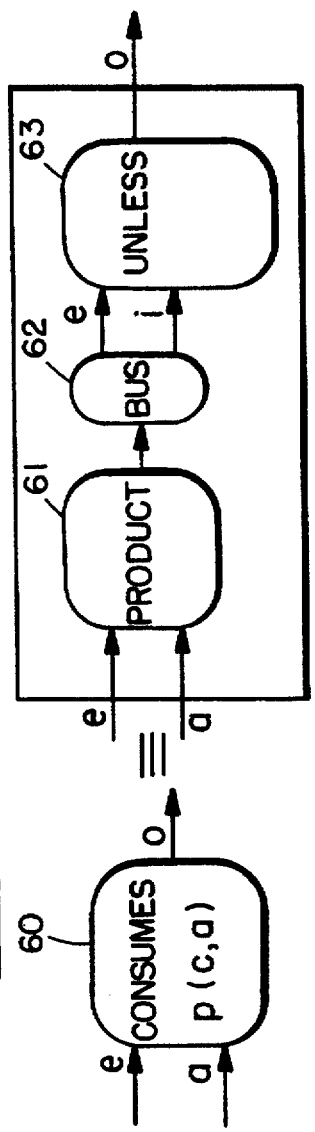
FIG. 7 is a diagram illustrating how a macro node such as a "consumes" node can be constructed from elemental nodes such as shown in FIGS. 3 and 4.
Figure 8:
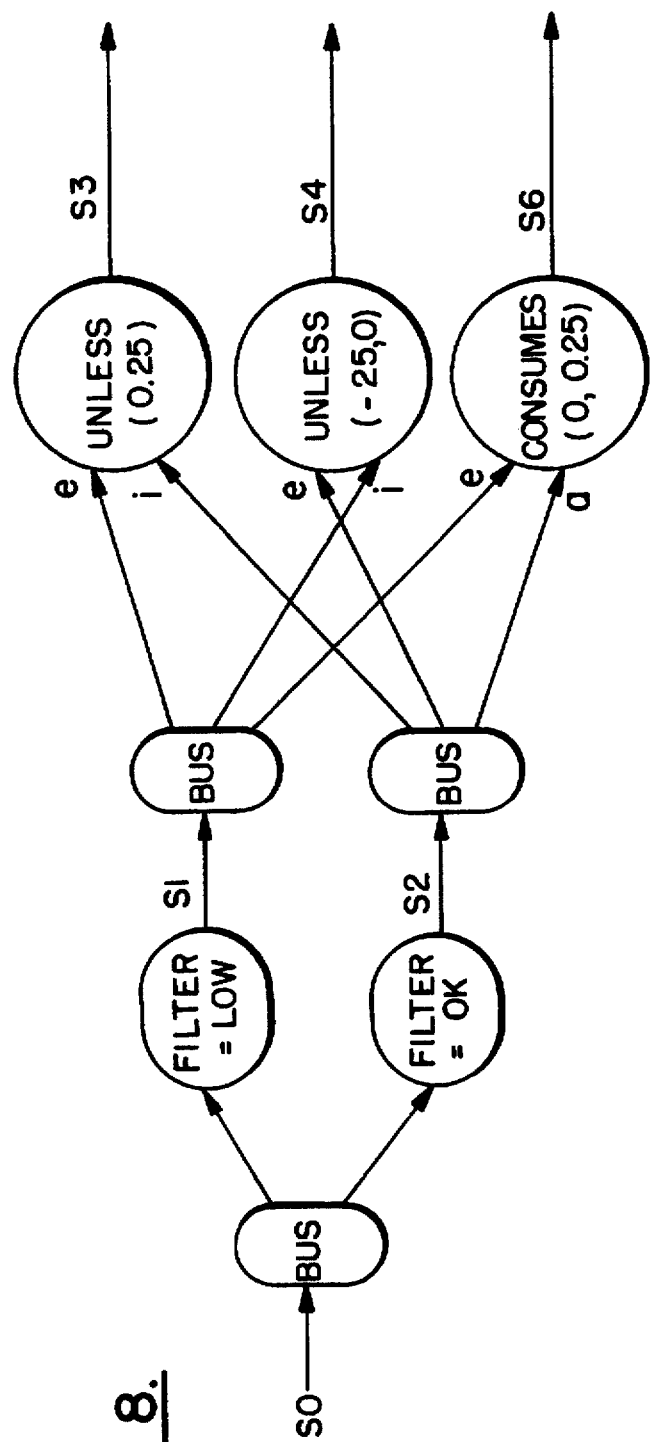
FIG. 8 shows a modified form of the FIG. 6A network utilising the FIG. 7 "consumes" node.
Figures 9, 10A:
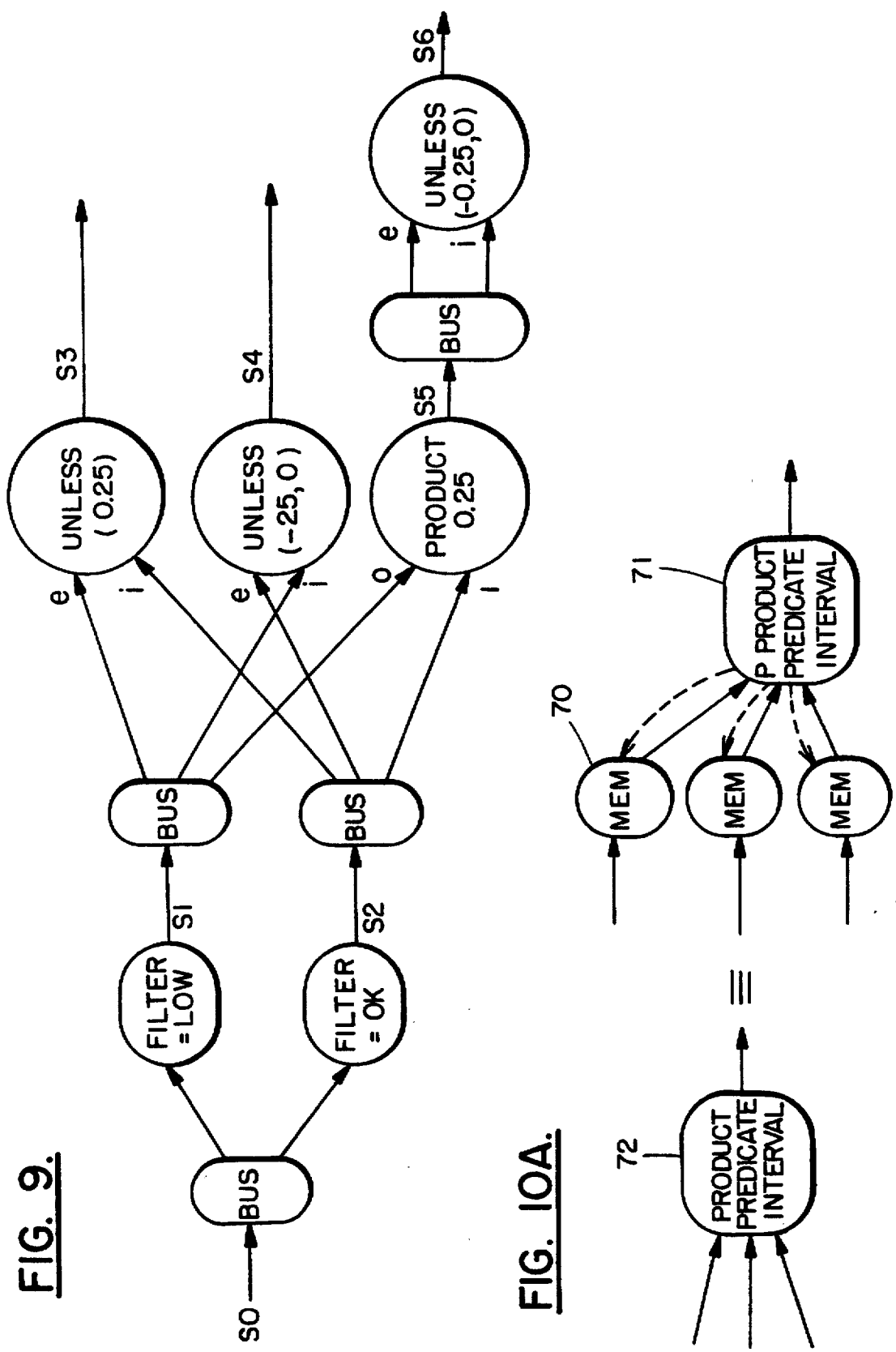
FIG. 9 shows the FIG. 8 network but with the "consumes" node expanded into its consistuent elemental nodes.
FIG. 10A is a diagram illustrating the construction of the FIG. 4A product node from a primitive product node and memory nodes.

The FIG. 7 "consumes" node can be substituted for the product node 47 and unless node 48 in FIG. 6A to give the network shown in FIG. 8; the expansion of the FIG. 8 network is shown in FIG. 9. It will be seen that, in fact, the FIG. 6A and FIG. 9 networks are not identical inasmuch as the inhibitor input to the final unless node from which stream S6 is output, comprises low voltage events in the FIG. 6A network whereas it comprises transient events in the FIG. 9 network. It will be appreciated that this difference has no effect on the overall functionality of the network.

The Primitive Product and Unless Nodes

Both the product and unless nodes (and their associated table-referencing forms) have a requirement to store event data items for a limited period, not only because they require comparison of event data items across a time window, but also because the variable transit delay of event data items must be taken into account when making comparisons. In fact, it proves to be advantageous to define a primitive memory node which is then used with a primitive node containing the desired basic functionality (product or unless functionality ) in order to provide the product and unless nodes of FIG. 4.

The functionality of a primitive memory node is as follows. All event data items entering the node are output; the minimum transit delays of the input and ouput streams are the same, and also the maximum transient delays of the input and output streams are the same. The memory node keeps a record of all event data items until they reach a certain age at which point they are forgotten. The memory node is kept sorted by creation time of events. An interrogation interface is provided by which the contents of the memory node can be searched.

FIG. 10A illustrates how memory nodes 70 and a primitive product node 71 are used to form a standard product node 72 with three input streams. The primitive product node 71, as well as receiving input streams from the memory nodes 70, can also interrogate these nodes through their interrogation interfaces, this being illustrated by dashed arrows in FIG. 10A. The primitive product node 71, on receiving an event data item on one input, checks to see whether the required event data items are present in the memory nodes associated with the other inputs for the time interval specified (this being the same for the primitive product node as for the product nodes 72). In order for the primitive product node 71 to be able to effect this check immediately upon receiving an event data item, the memory nodes 70 must hold events for long enough to take account of variations in transit delay and also to take account of the window interval. Furthermore, it will be appreciated that if, for example, it is required that an event data item associated with an input 1 occurs within 5 time units after an event data item associated with an input 0, then the primitive product node must both:

check the memory node associated with input 1 upon receipt of an event data item on input 0 (this check being to see if an input 1 event data item has been recorded as occuring within the 5 time units after the time occurrence of the input 0 event data item), and check the memory node associated with input 0 upon receiving an event data item on input 1 (this time the check is for whether there is an input 0 event data item that has occured in the 5 time units preceding the time of creation of the input 1 event data item).

Figure 10B:
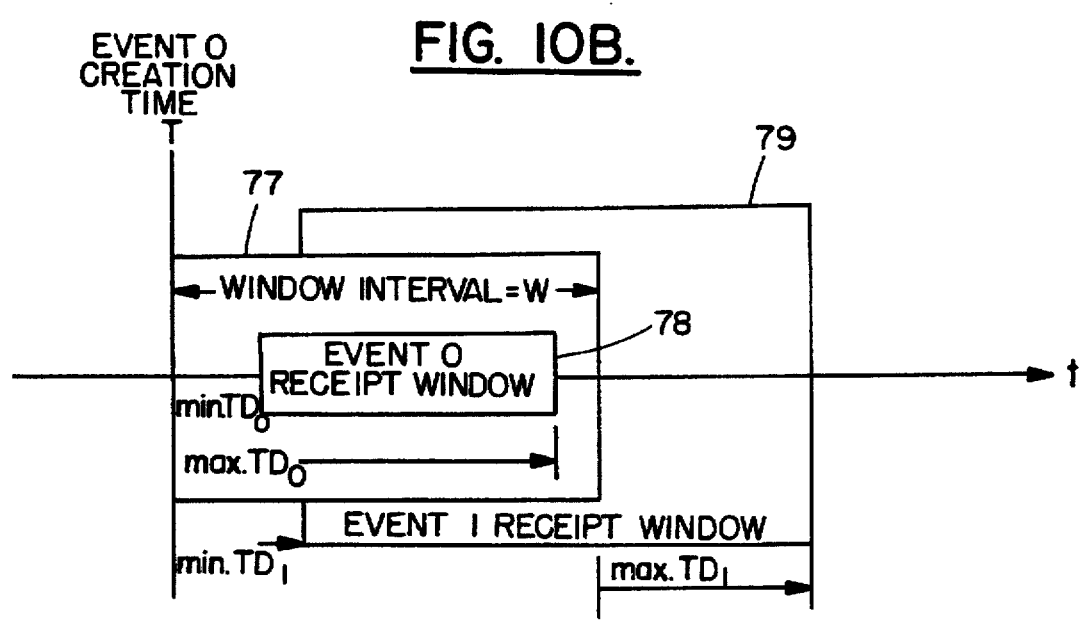
FIG. 10B is a time diagram facilitating an understanding of the storage duration requirements of the memory nodes of FIG. 10.

The time diagram of FIG. 10B serves to illustrate how the storage duration requirements of the memory nodes 70 are set. In this diagram it is assumed that an event data item appearing on an input (input 0) of the product node has a creation time of T; for convenience, it will be assumed that this event data item relates to an event 0. The product node is arranged to respond to the occurrence of an event data item on a second input (input 1) within a window interval W of the event 0 creation time T; this second event data item is taken to represent an event 1. In FIG. 10B, box 77 is used to represent the window interval of duration W during which event 1 needs to have occured for the product-node interval relation to have been satisfied. Box 78 represents the receipt window for event 0 at the product node 72, this window starting at a time $minTD_0$ after time T and ending at time $maxTD_0$ after time T ($minTD_0$ and $maxTD_0$ respectively being the minimum and maximum transit times for event 0). Box 79 represents the receipt time window for event 1 at the product node, for event 1 to satisfy the product node time interval relation with event 0; box 79 starts at time $minTD_1$ after the start of the window interval box 77 (that is after time T) and terminates at time $maxTD_1$ after the end of the time interval box 77.

If event 0 is received at the end of its window (box 78), then the memory node associated with input 1 may have had to have stored the event 1 since the beginning of the event 1 receipt window box 79, that is for a period:

$$maxTD_0 - minTD_1$$

On the other hand, if event 0 is received at the beginning of the event 0 receipt window box 78, then the memory node on input 0 may need to store this event from this time up until the end of the event 0 receipt window box 79, that is for a storage duration of:

$$W + maxTD_1 - minTD_0$$

Taking the general case where the order of receipt of events is disregarded, then for each pair of product-node inputs, it is possible to derive two storage duration values for each memory node of the form given above; in virtually all cases, the storage node duration corresponding to ($W+maxTD_1-minTD_0$) will set the storage duration for the memory node. Applying the same principle for every pairing of nodes and for convenience disregarding the minimum transit delay values, the storage duration of each memory node may be specified as being the window interval value W plus the maximum of the maximum transit delays for all of the product-node inputs except for the one whose memory node is being considered.

Figure 10C:
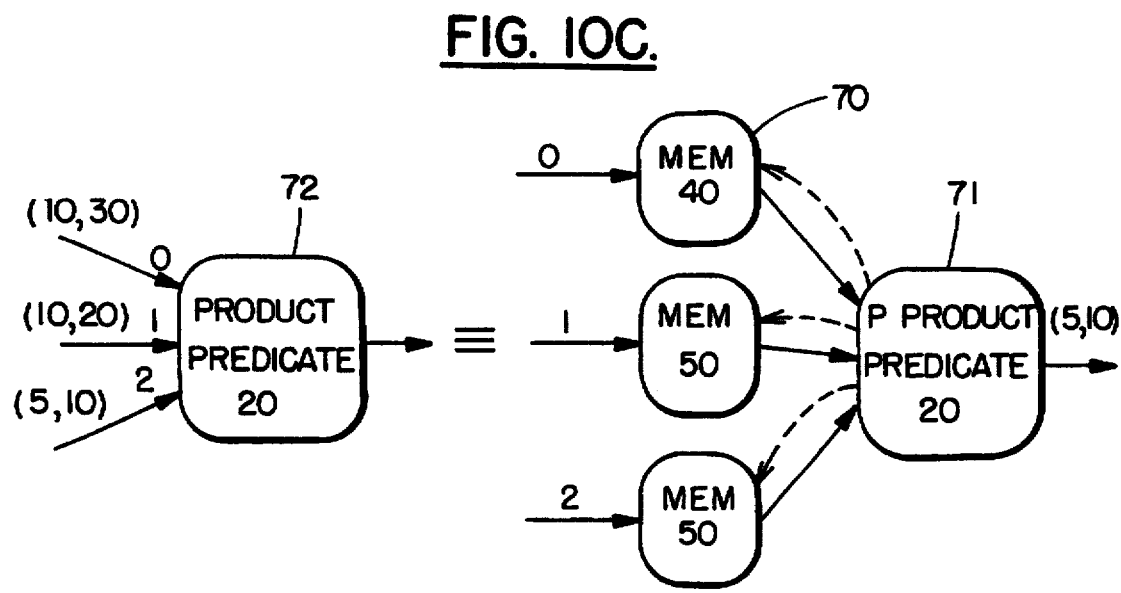
FIG. 10C is a diagram similar to FIG. 10 but giving a numeric example of the memory node storage durations.

Thus, for example, FIG. 10C shows a product node 72 with three input streams having minimum and maximum transit delays of (10, 30), (10, 20), and (5, 10). The product node has a window time interval of 20. In this case, the memory node 70 associated with input 0 will have a duration of the window interval (20) plus the maximum transit delay (20) associated with the streams for inputs 1 and 2 of product node. The memory nodes associated with inputs 1 and 2 will, however, have a duration equal to the window interval (20) plus the maximum transit delay (30) associated with the stream on input 0.

As regards the maximum transit delay of the output stream from the primitive product node, this will be equal to the minimum of the maximum transit delays of the input streams. Similarly, the minimum transit delay of the output stream will be equal to the minimum of the minimum transit delays of the input streams.

Figure 11A:
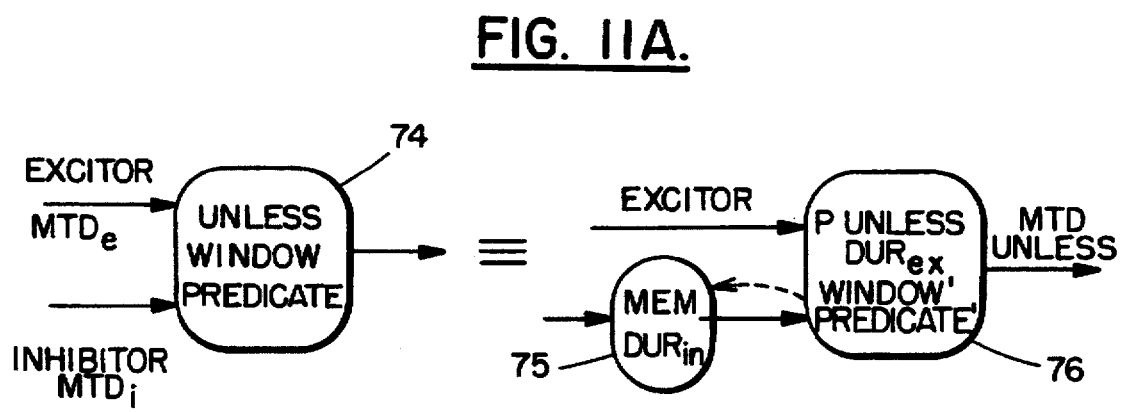
FIG. 11A is a diagram illustrating how the FIG. 4B unless node can be constructed from a primitive unless node and a memory node.

FIG. 11A illustrates how a basic unless node 74 may be built up from a primitive memory node 75 and primitive unless node 76. In this case, only the inhibitor stream input has a memory node; whilst it will generally still be required to store excitor event data items, this capability is assumed to be part of the primitive unless node (the reason for this is that the storage requirements for excitor event data items do not precisely match the characteristics of the standard primitive memory node).

The predicate and window interval are the same for the basic unless node 74 and the primitive unless node 76.

Figure 11B:
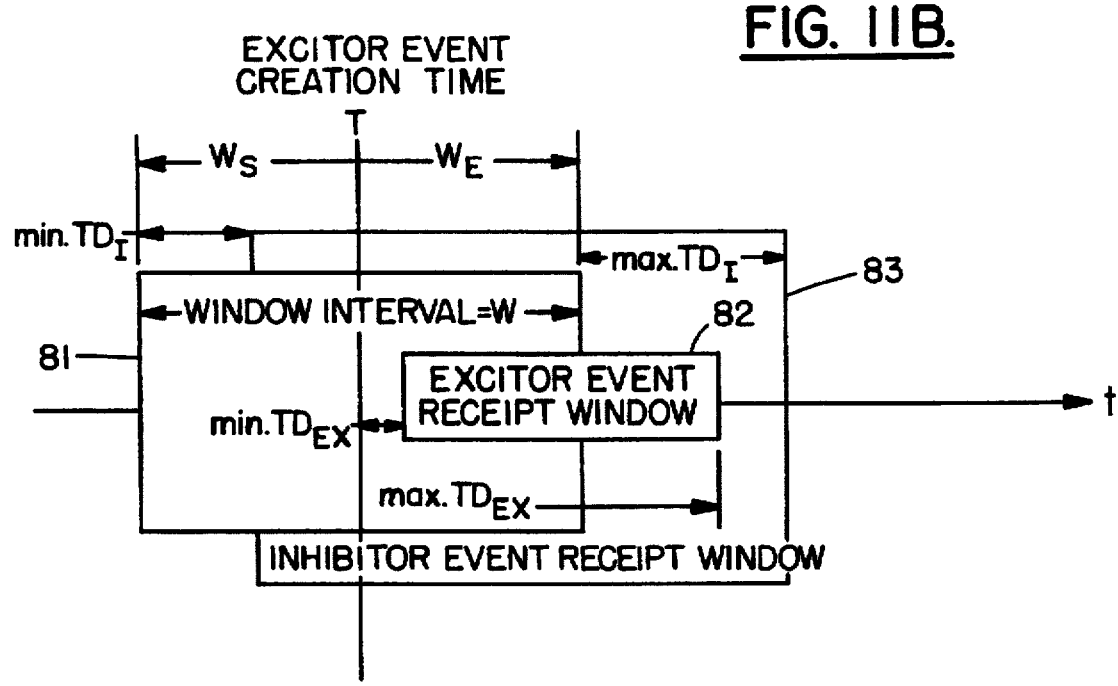
FIG. 11B is a time diagram facilitating an understanding of the storage duration requirements of the memory node and primitive unless node of FIG. 11B.

The memory node storage duration requirement is derived in a similar manner to the memory nodes of a product node as will now be explained with reference to FIG. 11B. However, for an unless node, the window interval W in which an inhibitor event may occur relative to an excitor event, may extend on both sides of the creation time of the excitor event as is depicted in FIG. 11B by block 81. The excitor event receipt window is depicted by box 82, this box extending between times $minTD_{EX}$ and $maxTD_{EX}$ after the excitor event creation time T. The inhibitor event receipt window is depicted by box 83; if the start and end of the window interval W are taken as occuring at times $W_S$ and $W_E$ relative to the excitor event creation time T, then the inhibitor event receipt window will start at time $minTD_I + W_S$ and the end of the inhibitor event receipt time window will be at time $W_E + maxTD_I$.

The storage duration required for the memory node 75 must be such as to cope with the situation where the excitor event is received at the end of its receipt window 82 whilst the inhibitor event has been received at the beginning of its window 83. This time duration is equal to:

$$maxTD_E - (W_S + minTD_I)$$

For convenience the minimum transit delay time is ignored giving a value for the storage duration of the memory node equal to $(maxTD_{EX} - W_E)$ where the value $W_E$ will be negative if the window interval commences before time T.

As regards the storage duration requirement for the primitive unless node in respect of excitor event data items, the worst case situation is when the excitor event is received after the minimum transit delay $minTD_{EX}$ whilst an inhibitor event is not received until the maximum transit delay time $maxTD_I$ after the end of the window interval at time $W_E$. This leads to a storage duration requirement of:

$$W_E + maxTD_I - minTD_{EX}$$

Again, it is convenient to ignore the value $minTD_{EX}$.

Figure 11C:
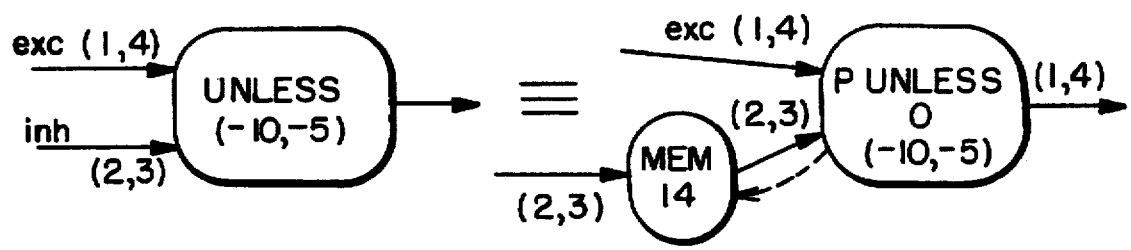
FIG. 11C is a diagram similar to FIG. 12 but showing a numeric example of the required storage durations of the memory node and primitive unless node.

FIG. 11C shows a numeric example in which the excitor input stream has minimum and maximum delays values of 1 and 4 respectively and the inhibitor input stream has minimum and maximum transit delays values of 2 and 3 respectively. The window interval associated with the unless node extends from 10 time units to 5 time units prior to the creation time of the excitor event. Using the formulae derived above, the memory node will have a storage duration requirement of $maxTD_{EX} - W_S$ (that is: 4−(−10)) giving a value of 14. The primitive unless node has an excitor storage duration value of $maxTD_I - W_E$ (that is 3+(−5)); this is a negative storage time which, of course, in practice means a zero storage time.

The maximum transit time for the output stream is equal to the maximum of the maximum transit delay of the excitor event and the combination of the maximum of the transit delays of the inhibitor event streams plus the value $W_E$. The minimum transit delay of the output stream is equal to the maximum of the minimum transit delays of the excitor stream and the combination of the maximum transit delay of the inhibitor stream plus the value $W_E$.

Breaking the product nodes and unless node down into primitive nodes together with memory nodes not only facilitates their implementation but also enables network optimisation as will be explained below.

Network Optimisation

Figure 12:
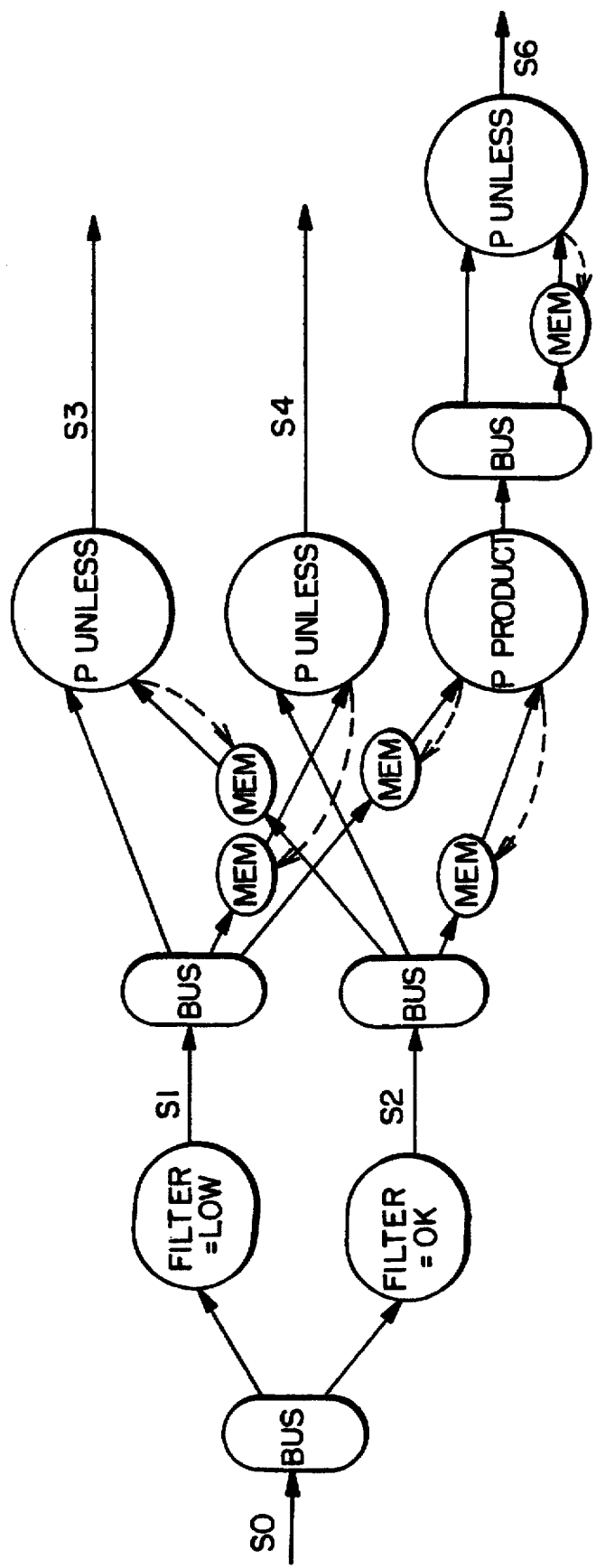
FIG. 12 shows the FIG. 9 network but with the unless and product nodes expanded into their forms shown in FIGS. 10 and 11.
Figure 13:
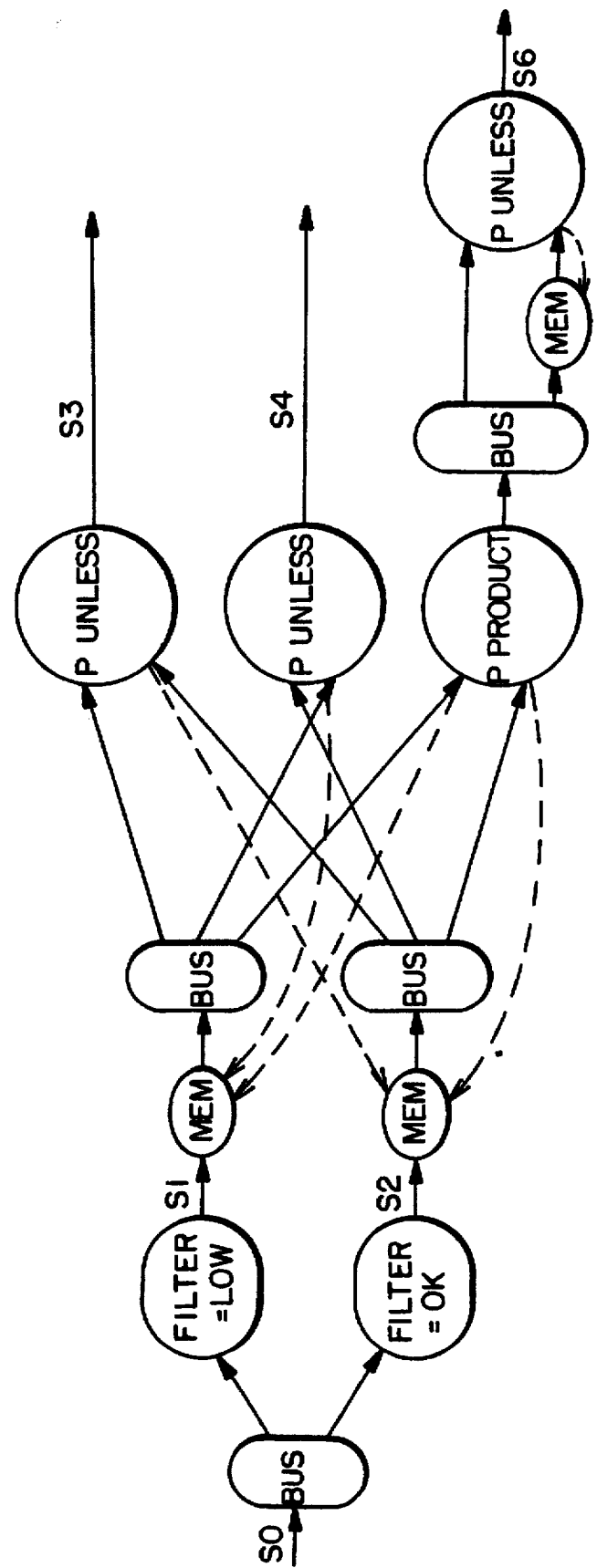
FIG. 13 shows the FIG. 12 network after optimisation.

As with standard boolean logic circuits, event-processing node networks of any complexity will generally lend themselves to optimisation particularly where product and unless nodes are involved. Thus for example, if the product and unless nodes of the FIG. 9 transient-event-detection network are expanded into their corresponding primitive nodes plus memory nodes, the network shown in FIG. 12 results. The FIG. 12 network may be optimised to reduce the number of memory nodes. FIG. 13 shows such an optimisation of the FIG. 12 network.

Implementation

It will be appreciated that the above described nodes can be implemented in a wide variety of forms ranging from dedicated hardware circuitry to software implementations based on object oriented programming techniques. In the currently preferred embodiment, the nodes are implemented as software data structures with nodes of the same type sharing processing functionality code. Whilst it is expected that a person skilled in the art would be able to effect such a preferred implementation, certain further details are given hereinafter to facilitate the understanding of the operation of the preferred embodiment.

Clocking strategies—Certain nodes, such as the delay and unless nodes, require follow up action to be taken. For example, when an event data item enters the delay node, it is not propagated immediately; instead, it is propagated after a pre-defined delay. Where the nodes are implemented in software, the question arises as to what scheduling strategy should be used to remember to revisit the delay nodes at the correct time to release the suspended data item. A number of approaches are possible, these being:

a scheduled interrupt could be used as a clock tick, in other words, each node would schedule an interrupt to coincide with the time that post-processsing was required. Whilst this approach is obviously the most elegant, it also is expensive in terms of processing;

the arrival of a new event data item at the event-processing system could be used as a clock tick for the entire system—this solution works well if there is a reliable and frequent supply of events to the entire system (though there is a danger that the frequency of follow up processing could become too high in which case follow up processing could be restricted to occuring no more than, say, once a second);

the arrival of an event data item could be used as a clock tick for that node only—whilst this approach is easily implemented, it is only feasible if there is a reliable and frequent flow of event data items to the nodes requiring follow-up action.

The second approach will generally provide a reasonable compromise.

Figure 14:
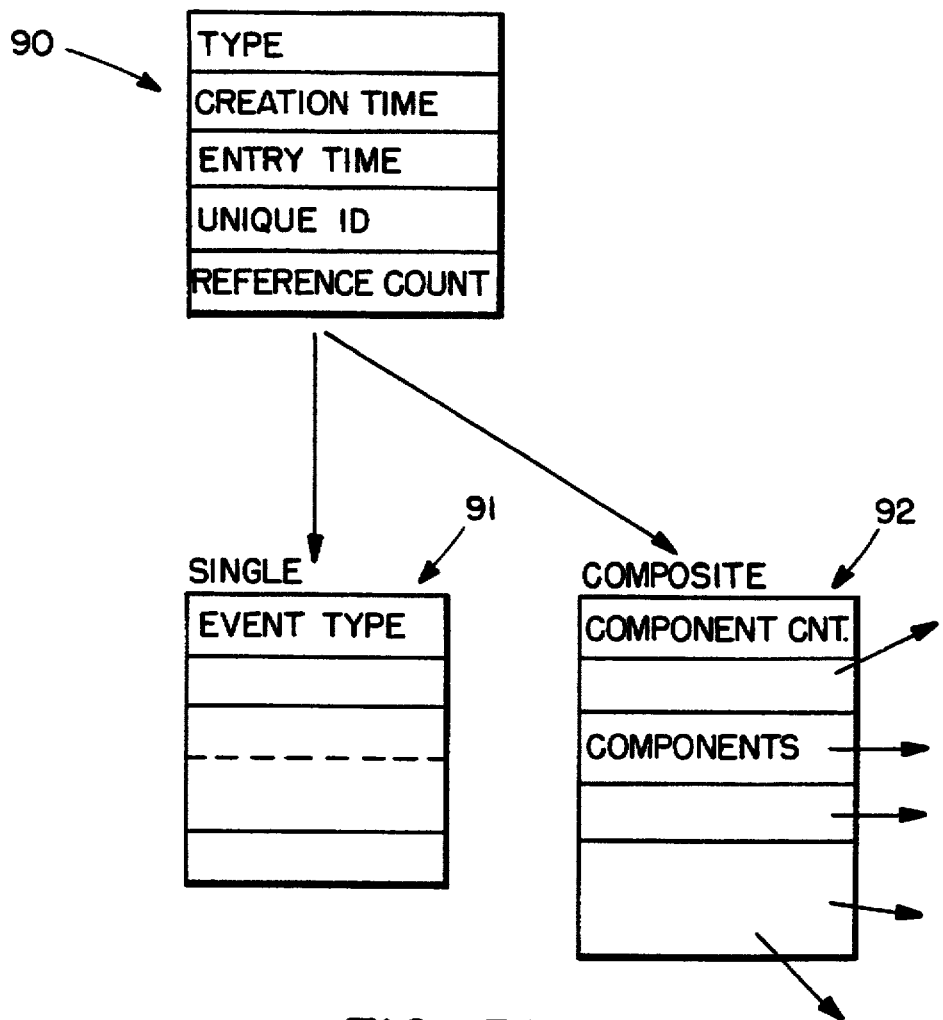
FIG. 14 is a diagram illustrating the data structures used for event data items passed between nodes.

Event data items—two different forms of data structures are used for event data items depending on whether the event data item relates to a single event (either a basic event occuring in the system being monitored, or a user-defined, higher-level event), or to a composite event made up of a combination of single events. FIG. 14 shows the format of the date structure used for the event data items and, as can be seen, there is a block 90 of common fields for each event data item. In addition, event data items relating to single events have a further block of fields 91 whilst event data items relating composite events have a further block of fields 92. The fields of the block 90 common to all event data types are:

a type field indicating whether the event data item relates to a single event or to a composite event;

a creation time field containing a timestamp indicating the creation time of the event in the system being monitored (failing which, the timestamp indicates the time of receipt at the event-processing system);

an entry time field indicating the time the event was received by the event processing system;

a unique ID field uniquely identifying the event data item within the event-processing system (this ID is alloted when the event data item is generated);

a reference count field that is used to record the number of nodes or other system objects (such as composite event data item structures) that are pointing at the event data item concerned—once the reference count value drops to zero, then the event data item may be discarded.

Figure 15A:
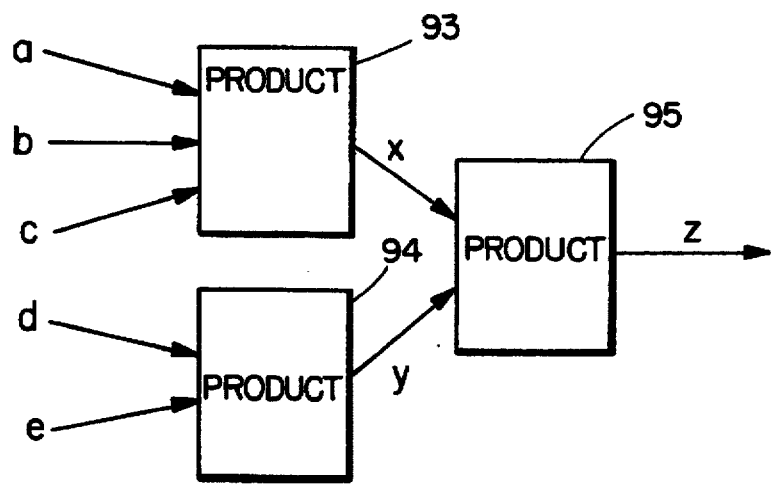
FIG. 15A is a diagram of a simple network comprising three product nodes that operate to combine five input event streams of basic events into one output event stream of composite events.
Figure 15B:
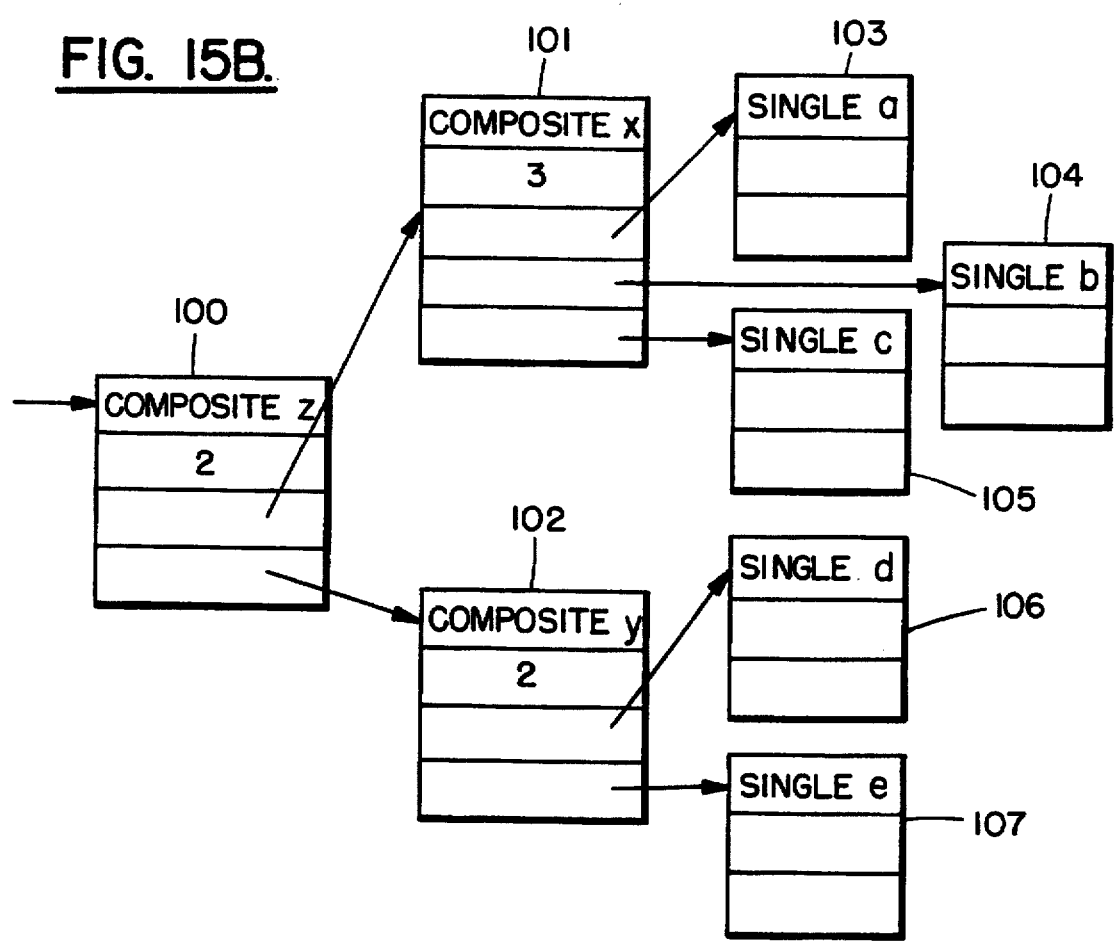
FIG. 15B is a diagram showing the composition of each event data item in the output event stream of FIG. 15A.

The fields in block 91 associated with a single-event event data item are an event type field and a set of fields predetermined for each event type. The fields in block 92 associated with a composite-event event data item are a field indicating the number of components of the composite event and then a respective field for each component that contains a pointer to that component. Each such component will either be a single-event event data item or another composite-event event data item. FIG. 15 illustrates the use of a composite-event event data item data structure. FIG. 15A shows a network made up of three product nodes 93, 94 and 95, product nodes 93 receiving on separate inputs single-event event data items "a", "b" and "c" which it combines into a composite event data item X for passing on to product node 95. The product node 94 receives single-event event data items "d" and "e" which it combines into a composite-event event data item Y for passing to the product node 95. Product node 95 combines the two composite-event event data items X and Y into a further composite-event event data item Z. FIG. 15B shows how the data structure for the composite-event event data item Z is indirectly linked back to the single-event event data item data structures. Thus, the data structure 100 for the composite event Z contains two component pointers pointing to data structure 101 and 102 for the composite events X and Y respectively. The data structure for composite event X comprises three component pointers which point to respective data structures 102, 103 and 104 respectively associated with the single events "a", "b" and "c". The data structure 102 for the composite event Y contains two component pointers pointing to the data structures 106 and 107 for the single events d and e.

It should be noted that combination of basic events may be represented either in composite-event event-data-item data structure or in a single-event event-data-item data structure; in the latter case, the user will have defined a higher-level event corresponding to the combination of basic events (and a mutator node then used to convert a composite-event data structure representing the combination of basic events, into the single-event data structure defined for the higher-level event).

Figure 16:
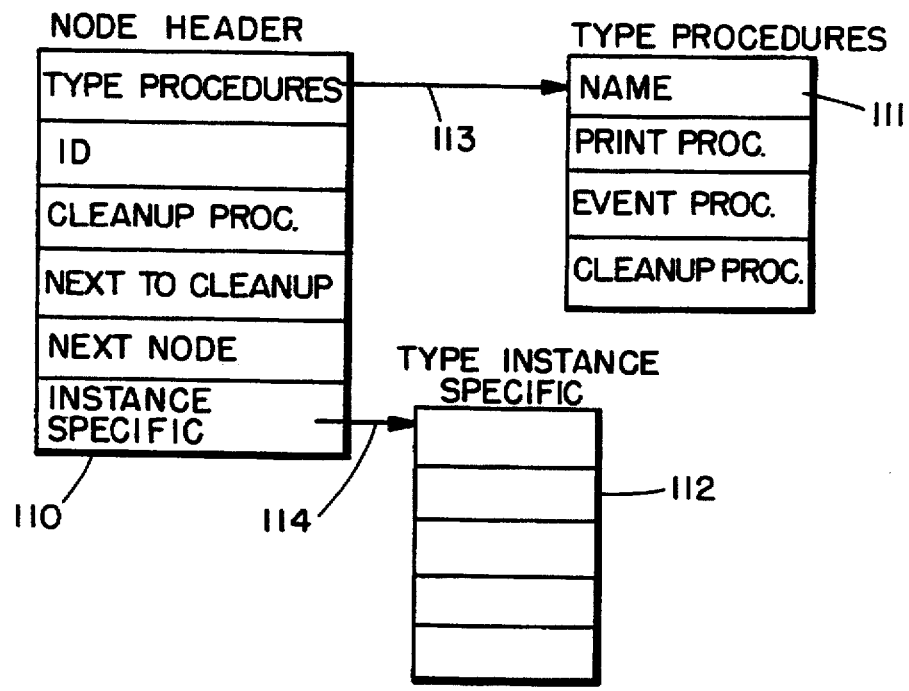
FIG. 16 is a diagram illustrating the basic data structure used to implement each event-processing node.

Node Data Structure—Each instance of a network node comprises a corresponding data structure the form of which is shown in FIG. 16. This data structure comprises three parts, namely, a node header part 110, a type procedure part 111, and a type instance specific part 112; the node header part 110 contains pointers 113 and 114 to the other two parts of the data structure.

In addition to the pointers 113 and 114, the node header part contains fields that are common to all nodes. These fields include a unique ID field, and a next node pointer field that is used to link all nodes into a single linked list. In addition there are two fields concerned with cleaning up processing; this is because some nodes need to have such processing effected at periodic intervals (examples include the delay node and unless node). The nodes requiring clean-up processing are linked together into a list by a "next to clean up" pointer in the node header of the nodes concerned. The clean-up processing of a node is effected by a clean-up procedure pointed to by pointer held in a "clean-up procedure" field of the node header; in fact, generally a clean-up procedure will be defined for each type of node and this type clean-up procedure will be used unless there is entry in the clean-up procedure field of the node header.

The type procedure part 111 of the node data structure contains identifiers for all the processing functionality procedures associated with nodes of the type concerned. These procedures include a procedure for handling events arriving at the nodes, a procedure for cleaning up a node, and a procedure for printing out node data. The type procedure part 111 is common to all instances of nodes of the same type.

The type instance specific part 112 of the node data structure contains fields specific to each node type with the values stored in these fields being those specific to the current type instance. In particular, for event-processing nodes producing an output stream of event data items, part 112 will include fields indicating the destination port or ports for the output stream or streams produced by the node, a destination port being a combination of the destination node ID and a port number for that node (the port number serving to distinguish, for example, between the excitor and inhibitor inputs of an unless node).

Figure 17:
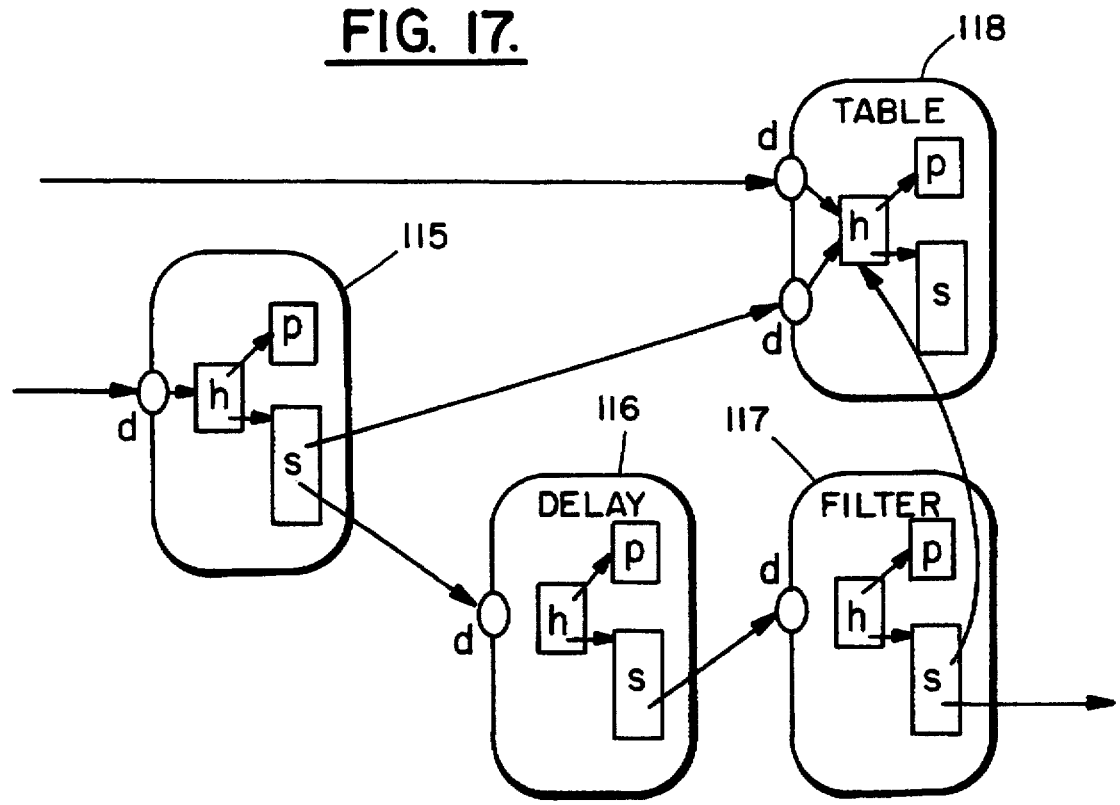
FIG. 17 is a diagram illustrating for four nodes how the data structures of the nodes relate to each other.

FIG. 17 illustrates an example of how the data structures of four nodes 115 to 119 may interrelate to each other in a specific network. In FIG. 17:

d=input port h=node header p=type procedures s=type instance specific data

The fields contained in the type instance specific part 112 of each node data structure are set out below for each node type. It will be noted that for node types that require to store input event data items, one of the fields contained in part 112 will be a pointer to the sequence of events stored. Each node type also contains a field for recording the number of input event data items and, where appropriate, a field for counting the number of output event data items, these fields being useful in analysing overall network operation.

| Node | Fields |
|---|---|
| Action Node | Number of events entering<br>Procedure to call<br>Pointer to private storage |
| Bus Node | Number of events entering<br>Number of destinations<br>Destination #1<br>Destination #2 |
| Delay Node | Number of events entering<br>Number of events leaving<br>Retirement Age<br>Pointer to sequence of events<br>Destination |
| Filter Node | Number of events entering<br>Number of events leaving<br>Pointer to predicate proc.<br>Destination |
| Memory Node | Number of events entering<br>Retirement age<br>Pointer to sequence of events<br>Destination |
| Product Node | Number of events entering<br>Number of events emitted<br>Acceptance Interval Width<br>Predicate<br>Number of inputs<br>Pointer to memory node 1<br>Pointer to memory node 2<br>Pointer to memory node n<br>Number of order pairs<br>Order from     to<br>Order from     to<br>Etc.<br>Destination |
| Table Node | Number of events entering<br>Number of events retired<br>Pointer to sequence of events<br>Pointer to prehistoric events<br>Retirement age<br>Pointer to retirement proc. |
| Unless Node | Number of excitor events<br>Number of inhibitor events<br>Number of events emitted<br>Pointer to excitor sequence<br>Pointer to inhibitor mem node<br>Max transit delay for inhibitors<br>Offset to Window start<br>Offset to Window end<br>Inhibitor/Excitor predicate<br>Destination |

Utilisation

Figure 18:
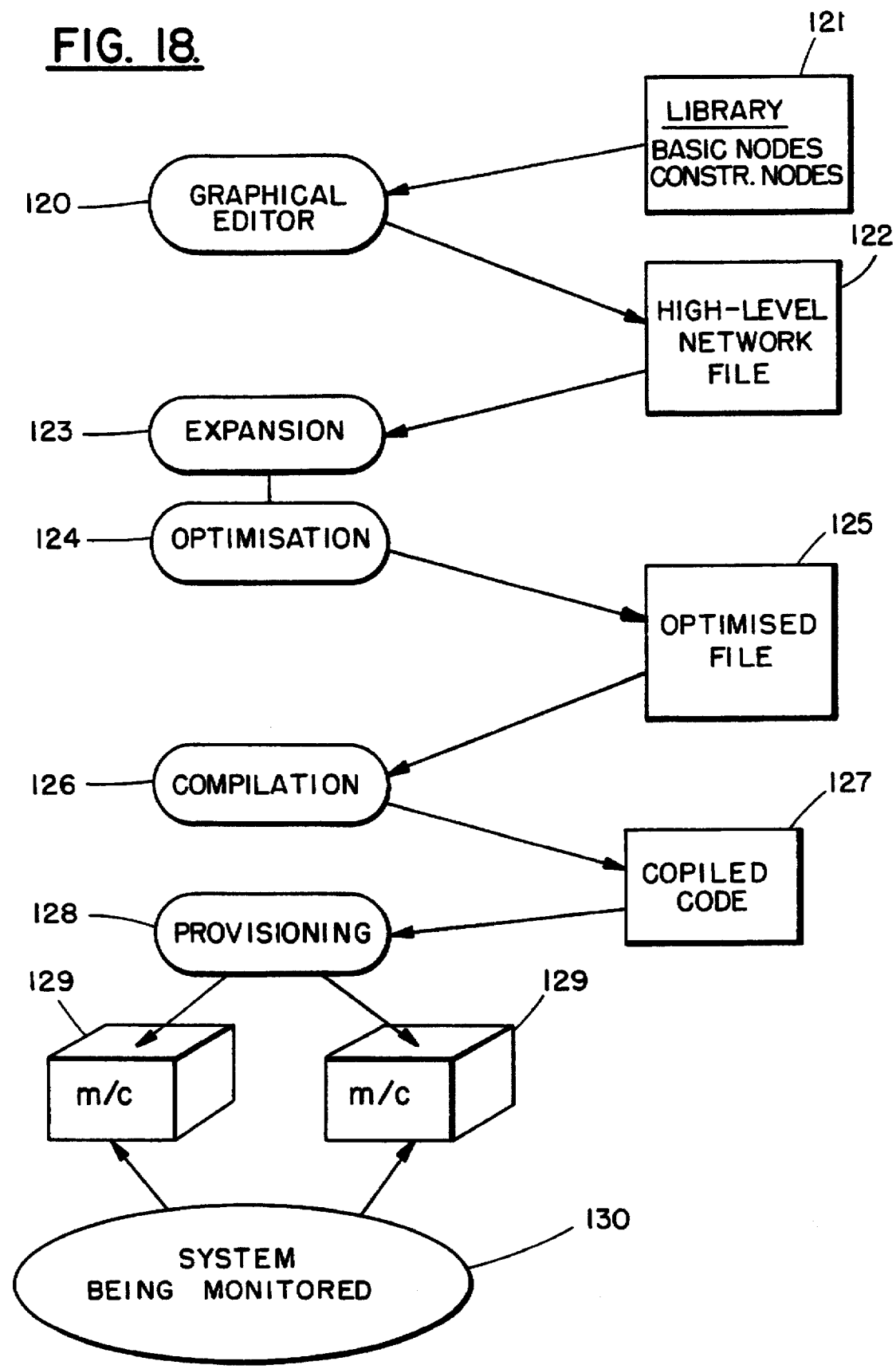
FIG. 18 is a diagram illustrating the steps involved in creating and loading a new event-processing system embodying the invention; and, FIG. 19 is a diagram illustrating how event processing systems built from event-processing nodes can be arranged in an hierarchical manner.

FIG. 18 illustrates the main steps involved in implementing an event-processing system embodying the present invention. Generally, system design will be done at a workstation using a graphical editor package 120 that gives access to a library 121 of node objects, these objects representing the basic nodes (for example, a set of basic nodes described above with reference to FIGS. 3 to 5) and any user constructed nodes which a user has thought useful to place in the library 121. The user then designs the desired event-processing network by pulling up nodes from the library and appropriately associating them using tools from the graphical editor 120. During this process, the user specifies all the required parameters such as delay time, event orderings for product nodes, etc. The result of this process is the generation of a high level network description file 122.

This high level description file is then automatically processed to expand the user constructed nodes into basic nodes and then to expand basic product and unless nodes into their corresponding primitive counterparts and the memory nodes. Thereafter, an automatic optimisation process 124 is executed to produce an optimised network design file 125. This file 125 is then compiled (box 126) to generate all the appropriate procedures and data structures. The compiled code 127 is then loaded (provisioning process 128) onto the target machine or machines 129 that provide the input event data items from the system being monitored 130. It may be noted that for nodes of the event-processing system that exists on the same machine, event data items are passed on between nodes generally by the passing of pointers between the node procedures; however, in the case where the event-processing system is distributed across several machines, then an appropriate remote communication procedure must be used. Of course, it will only be practical to distribute an event-processing system across several machines where there is no need for one part of the system to continually reference data held by the other part.

Figure 19:
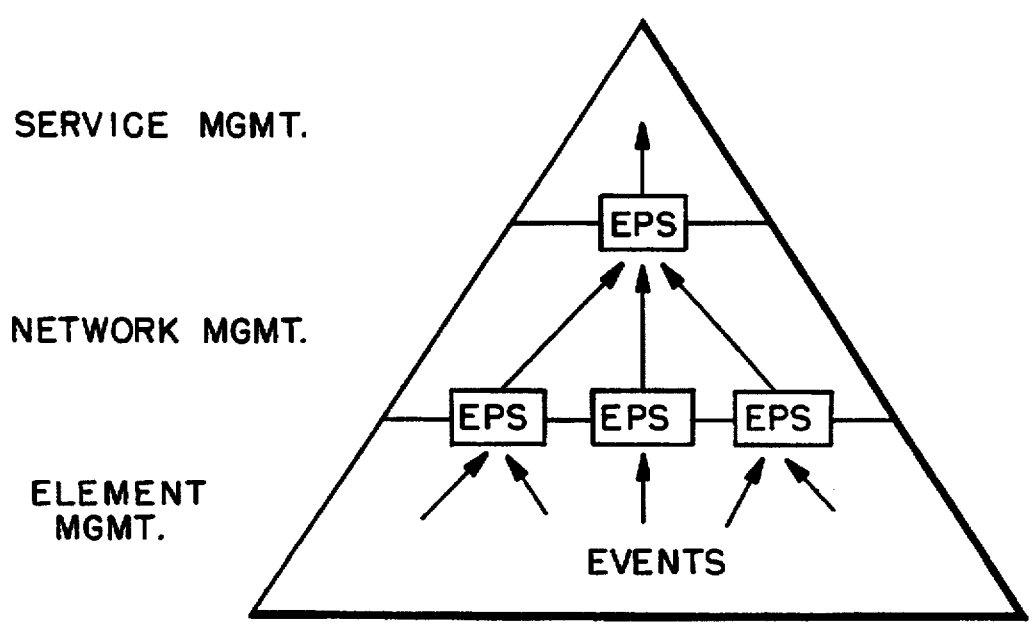

FIG. 19 is a diagram illustrating that for monitoring large systems such as telecommunications networks, it will generally be appropriate to provide event-processing systems (EPS) at several levels, for example, at a network management level and at a service management level. The nature of the event-processing systems described herein makes these systems highly suitable for use in a hierarchy where the low level basic events produced by the system being monitored are progressively transformed into higher level events (composite events or user defined events) in a progressive manner.

Miscellanous

It will, of course, be appreciated that many variants are possible to the event-processing system described above. In particular, the set of basic nodes described with reference to FIGS. 3 to 5 may be changed as considered appropriate. Thus, for example, it might considered useful to have an OR node for merging together streams of identical type.

I claim:

1. An event processing system for receiving and processing event information about basic events occurring in a system monitored, said basic events comprising changes in state in said system being monitored, the event-processing system comprising:

a plurality of discrete event-processing nodes, at least one event processing node being coupled to said system being monitored, each operative to process event data items, each said event data item relating either to a basic event or to a combination of such basic events and having event data that is indicative of a nature and time of occurrence of said basic event or combination of events, as the case may be, in the system being monitored, each node receiving at least one input of said event data items which it processes to produce at least one output stream of said event data items; and means for coupling said nodes to form a network of nodes in which output streams of at least some said nodes form input data streams of other of said nodes, said at least one event processing node coupled to said system being monitored and constituting an input node for receiving said event information in the form of at least one said input data stream, said nodes, as so coupled, facilitating assessment of system operation.

2. A system according to claim 1, wherein at least one of said event-processing nodes is a cross-event processing node operative to detect a predetermined inter-relationship between events represented by said event data items, the existence of said predetermined relationship being a necessary condition for the output of an event data item in a said output stream associated with the node.

3. A system according to claim 2, including a said cross-event processing node in the form of a product node for receiving a plurality of input streams of event data items, said predetermined relationship being between event data items present in said input streams and being satisfied upon the existence of event data items in said input streams that are in given time relation to each other, each event data item of the output stream relating to a combination of the events represented by the event data items of said input streams.

4. A system according to claim 2, including a said cross-event processing node in the form of an unless node for receiving first and second input streams of event data items, said predetermined relationship being between event data items of said input streams and being satisfied upon the existence of an event data item in said first input stream without the existence of an event data item in said second input stream that is in given time relation to the event data item of the first input stream, each event data item of the output stream corresponding to an event data item of said first input stream.

5. A system according to claim 2, further comprising a table node arranged to receive an input stream of event data items and to store event data therefrom including said time of occurrence, the table node being responsive to being interrogated with a specified time, to return event data current at that time; said event-processing system including a said cross-event processing node for which said predetermined relationship takes the form of a given time relation between an input event data item and a particular event data item which, if it has occurred, has its event data stored in said table node, said given time relation being met if at a particular time said particular event data item was the most current item with event data stored in the table node, the cross-event processing node testing for this time relation by interrogating said table node with said particular time and examining the returned event data to ascertain if it indicates the presence of said particular event data item.

6. A system according to claim 5, wherein the event data stored in said table node for each said event data item comprises the value of a given parameter of the system being monitored; said particular event data item of interest to said cross-event processing node, being any such item the stored parameter value of which lies in a predetermined range of values.

7. A system according to claim 1, wherein at least one of said event-processing nodes is a single-event processing node operative to effect its processing on the basis of each input event data item taken in isolation.

8. A system according to claim 7, including a said single-event processing node in the form of a filter node for selecting from an input stream any event data item the event data of which meets predetermined selection criteria, the selected event data items being output in an output stream from the node.

9. A system according to claim 7, further comprising clock means for providing a time reference corresponding to that used to provide the timestamps of the event data items, the event processing system including a said single-event processing node in the form of a delay node for receiving event data items in an input stream and for delaying the output of each such event data item in an output stream until a predetermined time period after the said time of occurrence associated with that item, the delay node judging when said predetermined time period has elapsed by referring to said time reference.

10. A system according to claim 1, further comprising output action means for receiving a said output stream and effecting a corresponding action in response to the event data items thereof.

11. A system according to claim 1, wherein for each type of said event-processing node in terms of the processing effected thereby, there is provided functional processing code for carrying out that processing, each said event-processing node having associated data including:

first data, the same for all nodes of the same type, that identifies said functional processing code relevant to that node type whereby the functional processing code is shared by all nodes of the same type; and second data, specific to each node, including data that identifies for each of said at least one output stream associated with the node, the destination of the stream.

12. A system according to claim 11, wherein the means for intercommunicating said nodes comprises means for passing an event-data-item pointer from one node to another.

13. A system according to claim 1, wherein a said event data item relating to a combination of basic events comprises a set of component event data items, this structuring being recursively implemented for each component event data item until each component event data item directly relates to a said basic event.

14. A method of building an event processing system for receiving and processing event information about basic events occurring in a system being monitored, said basic events comprising changes in state in said system being monitored, said method comprising the steps of:

providing a library of event processing nodes each operative to process event data items, where each event data item relates either to a basic event or to a combination of such basic events and has event data that is indicative of the nature and time of occurrence of said basic event or combination of events, as the case may be, in the system being monitored, each node being intended to receive at least one input stream of said event data items which it can then process to produce at least one output stream of said event data items; and selecting nodes from said library and coupling said nodes to form a network of nodes in which output streams of at least some of said nodes form input streams of other of said nodes, at least one said node constituting an input node for receiving said event information in a form of at least one said input stream, said nodes, as so coupled, facilitating assessment of system operation.

15. A method according to claim 14, wherein said library comprises nodes of the following types:

single-event processing nodes each operative to effect its processing on the basis of each input event data item taken in isolation, cross-event processing nodes each operative to detect a predetermined inter-relationship between events represented by said event data items, the existence of said predetermined relationship being a necessary condition for the output of an event data item in a said output stream associated with the node.

16. A method according to claim 15, wherein said single-event processing nodes comprise node of the following types:

a filter node for selecting from an input stream any event data item the event data of which meets predetermined criteria stored in the node, the selected event data items being output in an output stream from the node; and a delay node for receiving event data items in an input stream and for delaying the output of each such event data item in an output stream until a predetermined time period after the said time of occurrence associated with that item, the delay node judging when said predetermined time period has elapsed by referring to said time reference;

and wherein said cross-event processing nodes comprise nodes of the following types:

a product node for receiving a plurality of input streams of event data items, said predetermined relationship being between event data items present in said input streams and being satisfied upon the existence of event data items in said input streams that are in given time relation to each other, each event data item of the output stream relating to a combination of the events represented by the event data items of said input streams;

an unless node for receiving first and second input streams of event data items, said predetermined relationship being between event data items of said input streams and being satisfied upon the existence of an event data item in said first input stream without the existence of an event data item in said second input stream that is in given time relation to the event data item of the first input stream, each event data item of the output stream corresponding to an event data item of said first input stream.

17. A method according to claim 16, further comprising nodes of the following type:

a table node arranged to receive an input stream of event data items and to store event data therefrom including said time of occurrence, the table node being responsive to being interrogated with a specified time, to return event data current at that time;

a said cross-event processing node in the form of a table-referencing node for which said predetermined relationship takes the form of a given time relation between an input event data item and a particular event data item which, if it has occurred, has its event data stored in said table node, said given time relation being met if at a particular time said particular event data item was the current item with event data stored in the table node, the table-referencing processing node testing for this time relation by interrogating said table node with said particular time and examining the returned event data to ascertain if it indicates the presence of said particular event data item.

18. A method according to claim 14, wherein for each type of said event-processing node in terms of the processing operations effected thereby, there is provided functional processing code for carrying out that processing, each said event-processing node having associated data items including:

first data, the same for all nodes of the same type, that identifies said functional processing code relevant to that node type; and second data, specific to each node, including data that identifies for each of said at least one output stream associated with the node, the destination of the stream.

* * * * *